ized Patent

(12) United States Patent
Ma et al.

(10) Patent No.: US 10,901,153 B2
(45) Date of Patent: Jan. 26, 2021

(54) NULL BIAS MACH-ZEHNDER INTERFEROMETER WITH RING RESONATORS

(71) Applicant: Elenion Technologies, LLC, New York, NY (US)

(72) Inventors: Yangjin Ma, Brooklyn, NY (US); Alexandre Horth, Astoria, NY (US); Matthew Streshinsky, New York, NY (US); Ruizi Shi, New York, NY (US); Rafeed Sukkar, Niles, IL (US); Richard Younce, Naperville, IL (US); Michael J. Hochberg, New York, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/231,744

(22) Filed: Dec. 24, 2018

(65) Prior Publication Data

US 2020/0200975 A1    Jun. 25, 2020

(51) Int. Cl.
    *G02B 6/293*    (2006.01)
    *G02B 6/12*    (2006.01)

(52) U.S. Cl.
    CPC ..... *G02B 6/29353* (2013.01); *G02B 6/12007* (2013.01); *G02B 6/29338* (2013.01); *G02B 2006/12159* (2013.01); *G02F 2203/15* (2013.01)

(58) Field of Classification Search
    None
    See application file for complete search history.

(56) References Cited

U.S. PATENT DOCUMENTS

| | | | | |
|---|---|---|---|---|
| 6,943,931 B1 * | 9/2005 | Dingel | ................ | G02F 1/2255 |
| | | | | 359/279 |
| 8,588,556 B1 * | 11/2013 | Dong | ................... | G02F 1/025 |
| | | | | 359/237 |
| 8,818,141 B1 * | 8/2014 | Hochberg | ............ | H04B 10/505 |
| | | | | 385/2 |
| 2016/0195791 A1 * | 7/2016 | Denoyer | ............... | G02F 1/2255 |
| | | | | 385/3 |

* cited by examiner

*Primary Examiner* — Chad H Smith
(74) *Attorney, Agent, or Firm* — Stratford Managers Corporation

(57) ABSTRACT

In Mach-Zehnder interferometer (MZI) based modulators (MZM) input laser light comes in from one side, gets split into two MZI arms, then recombined at an opposite side. Each MZI arm may be phase or intensity modulated depending on the set phase offset, whereby coherent or intensity modulation may be performed which can later be de-coded by a receiver. Ring resonator type modulators (RRM) are compact; however, their phase response is nonlinear, normally limiting their application in coherent phase modulation. However, a combined MZI RRM overcomes the shortcomings of the prior art by providing a novel structure and driving scheme for use with semiconductor photonics that takes advantage of the compactness of ring modulators and the linearity of MZI by setting the ring resonators to resonate at the input laser light wavelength.

16 Claims, 27 Drawing Sheets drive scheme1: $\phi_{static} = \pi, \phi_{RF1} = -\phi_{RF2},$
$\theta_{ring1} = \theta_{ring2} = 0$ (on resonance)

Region of interest

- BPSK drive scheme1: $\phi_{static} = \frac{\pi}{2}, \phi_{RF1} = -\phi_{RF2}, \theta_{ring1} = \theta_{ring2} = 0$ (on resonance)

QPSK constellation

QPSK direct eye

BPSK de-modulated eye diagram

NULL BIAS MACH-ZEHNDER INTERFEROMETER WITH RING RESONATORS

TECHNICAL FIELD

The present invention relates to a Mach-Zehnder interferometer, and in particular to a Mach-Zehnder interferometer with ring resonators.

BACKGROUND

Conventional Mach-Zehnder interferometer (MZI) based modulators (MZM) are well known in optical communication. Light comes in from one side, gets split into two MZI arms, top and bottom, then recombined at an opposite side. Each MZI arm may be phase or intensity modulated depending on the set phase offset, $\phi_{static}$, of the two MZI arms, whereby coherent or intensity modulation may be performed which can later be de-coded by a receiver.

The basic phase modulation format is 2-level binary phase shift keying (BPSK, or 2-PSK) modulation. The linear response in MZI optical field versus phase modulation makes it suitable not only for 2-level modulation format, but also higher level modulations, such as 4-PSK, 8-PSK or even higher. Taking advantage of other orthogonal dimensions, further multiplexing signals may form quadrature phase shift keying (QPSK) or dual-polarization QPSK (DP-QPSK) signals by linking multiple modulators in a suitable parallel fashion. Similarly, due to the linear response of an MZI, different levels of intensity modulation, such as on-off keying (OOK), 4-level pulse amplitude modulation (PAM4) and PAM8, may be obtained.

Silicon photonics enables the building of MZM on a chip, integrated together with other photonic components to build a complex system. Phase modulation introduced by carrier dispersion effect in silicon is fast, but typically has low efficiency. Modulator waveguides are usually running millimeters long to make sure then phase shift voltage, $V_\pi$, is low enough to work with a typical high-speed driver. Therefore, Si MZMs usually take a large portion of the entire silicon photonics chip. Ring resonator type modulators, on the other hand, are much more compact; however, their phase response is nonlinear, limiting their application in coherent phase modulation.

An object of the present invention is to overcome the shortcomings of the prior art by providing a novel structure and driving scheme for an MZM incorporating ring resonators for use with semiconductor photonics that takes advantage of the compactness of ring modulators and the linearity of MZI.

SUMMARY OF THE INVENTION

Accordingly, the present invention relates to a modulator comprising:

an input port for receiving an input optical signal at a source wavelength;

a splitter for splitting the input optical signal into first and second sub-beams;

first and second waveguide arms extending from the splitter capable of supporting the first and second sub-beams, respectively;

a first ring resonator structure coupled to the first arm capable of providing a first round trip phase delay ($\theta_{ring1}$) to the first sub-beam;

a first phase tuner structure capable of adjusting the first round trip phase delay ($\theta_{ring1}$);

a first phase modulator capable of biasing the first ring resonator structure generating a first RF phase delay ($\phi_{RF1}$) to the first sub-beam;

a second ring resonator structure coupled to the second arm capable of providing a second round trip phase delay ($\theta_{ring2}$) to the second sub-beam;

a second phase tuner structure capable of adjusting the second round trip phase delay ($\theta_{ring2}$);

a second phase modulator capable of biasing the second ring resonator structure generating a second RF phase delay ($\phi_{RF2}$) on the second sub-beam;

a static phase difference ($\phi_{static}$) in one of the first and second arms capable of creating a phase difference between the first and second sub-beams travelling in the first and second arms;

an output combiner for combining the first and second sub-beams into an output modulated signal;

a controller capable of instructing the first and second phase tuners to adjust the first and second round trip phase delay, respectively, whereby the first and second ring resonators resonate at the laser wavelength making the first and second round trip phase delays equal substantially zero; and an output port for outputting the output modulated signal.

Another aspect of the present invention relates to a method of operating a modulator, which comprises:

an input port for receiving an input optical signal at a source wavelength;

a splitter for splitting the input optical signal into first and second sub-beams;

first and second arms extending from the splitter capable of supporting the first and second sub-beams, respectively, the first and second arms including a static phase difference ($\phi_{static}$) in one of the first and second arms capable of creating a phase difference between the first and second sub-beams travelling in the first and second arms;

first and second ring resonator structures coupled to the first and second arms, respectively, capable of providing first and second round trip phase delays ($\theta_{ring1}$ and $\theta_{ring2}$) to the first and second sub-beams, respectively;

first and second phase tuner structures capable of adjusting the first and second round trip phase delays ($\theta_{ring1}$ and $\theta_{ring2}$), respectively;

first and second phase modulators capable of biasing the first and second ring resonator structures, respectively, generating first and second RF phase delays ($\theta_{ring1}$ and $\theta_{ring2}$) to the first and second sub-beams, respectively; and an output combiner for combining the first and second sub-beams into an output modulated signal;

the method comprising setting the first and second ring resonator structures to resonate at the laser wavelength making the first and second round trip phase delays equal substantially zero.

BRIEF DESCRIPTION OF THE DRAWINGS

The invention will be described in greater detail with reference to the accompanying drawings which represent preferred embodiments thereof, wherein.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
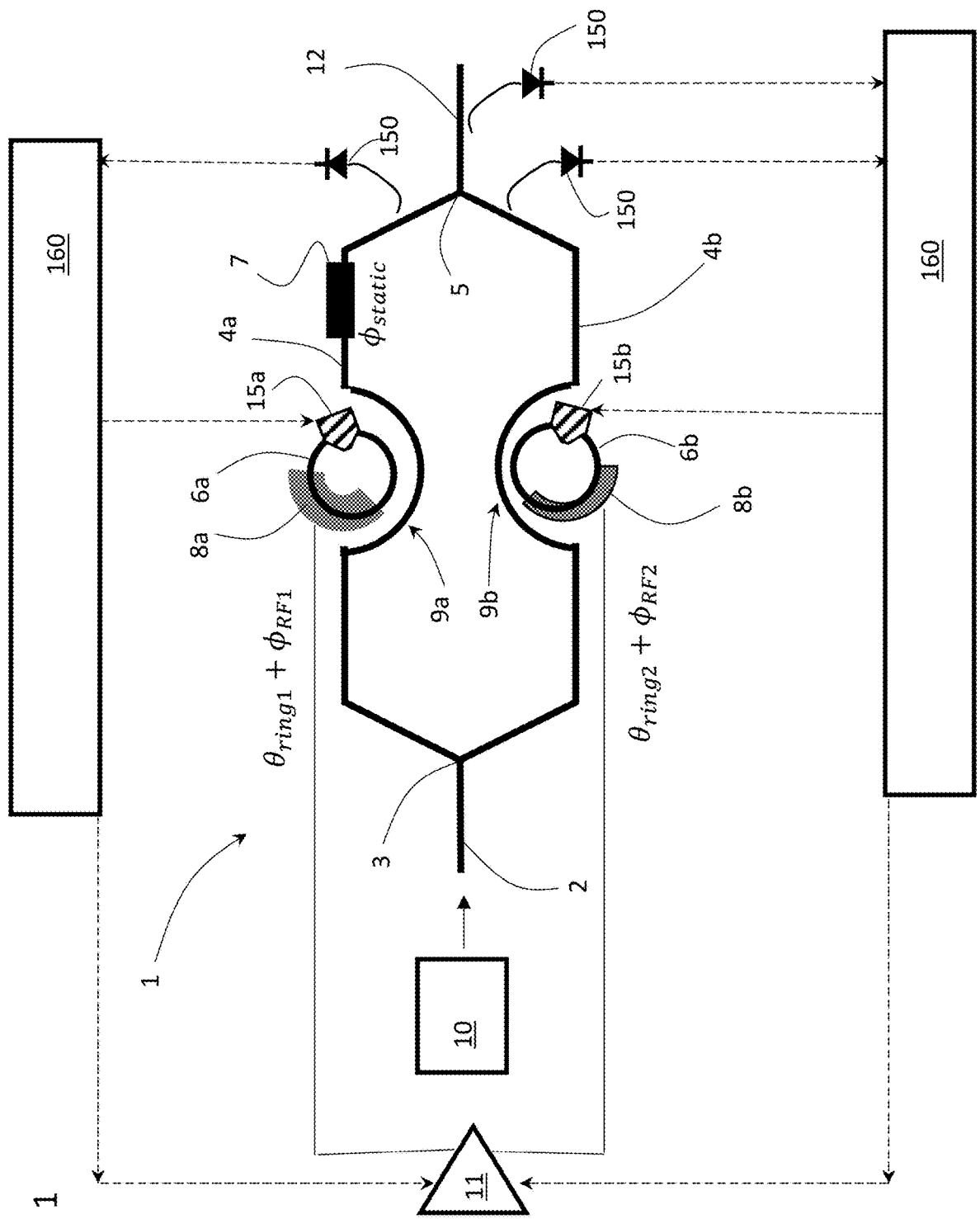
FIG. 1 is an schematic diagram of a Mach Zehnder interferometer ring resonator modulator (MZIRRM) device in accordance with an embodiment of the present invention.
Figure 2:
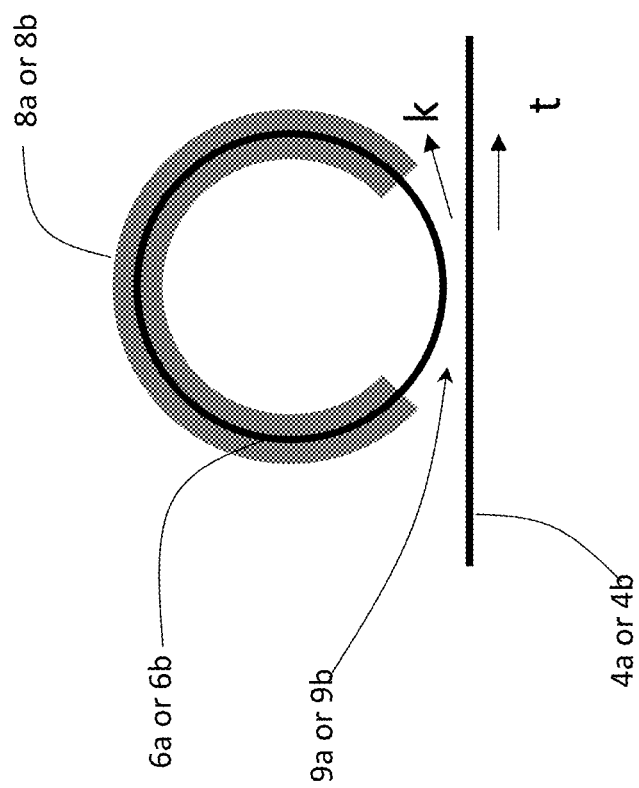
FIG. 2 is a schematic diagram of a ring resonator of the device of FIG. 1.

With reference to FIG. 1, a Mach-Zehnder interferometer ring resonator modulator MZIRRM 1 in accordance with the present invention includes an input 2, which may be optically coupled to a light source 10, which generates an input optical signal at a desired laser wavelength. A splitter 3 separates the input optical signal into two sub-beams, e.g. equal sub-beams, each one travelling in a respective MZ arm 4a and 4b of an MZI. Each MZ arm 4a and 4b is connected to a ring resonator modulator (RRM) structure 6a and 6b, respectively, via a suitable coupling region. The coupling region may include an arcuate or semi-circular section of the MZ arm 4a and 4b partially surrounding the RRM 6a and 6b, respectively. One or both of the MZ arms 4a or 4b may include a static phase difference 7 $\phi_{static}$, e.g. π or π/2, which may be fixed or adjustable, as hereinafter discussed. In a preferred embodiment both RRM structures 6a and 6b are substantially identical with substantially the same structure and characteristics, e.g. substantially the same length, radius, circumference, resonance wavelength and coupling ratio. Each RRM 6a and 6b (FIG. 2) may comprise a single or multiple ring with a high speed phase modulation section 8a and 8b, respectively, e.g. a PN junction, and optically coupled to one of the MZ arms 4a and 4b, respectively, at a coupling region 9a and 9b defined by a transmission coefficient t and a coupling coefficient k. After the two sub-beams undergo the desired relative phase delay, they are brought back together at coupler 5, e.g. Y-junction or 2×2 coupler, resulting in interference of the two sub-beams and the modulation of the output beam for transmission via output port 12.

Ideally, the two RRM's 6a and 6b may be differentially driven by a driver 11 connected to the phase modulation sections 8a and 8b, whereby the RRM's 6a and 6b undergo RF ring phase biases $\phi_{RF1}=-\phi_{RF2}$. The principle of a differential driven MZIRRM modulator 1 is as follows. First, the output amplitude of a single ring resonator 6a or 6b may be written as:

$$E_t = \frac{-\alpha + te^{i\theta}}{-\alpha t^* + e^{-i\theta}}$$

where t is the transmission coefficient of amplitude,
t* is complex conjugate of t,
α is the roundtrip loss of amplitude, and
θ is the roundtrip phase delay of the resonator.
For a lossless coupler, $|t^2|+|k^2|=1$, where k is the amplitude coupling coefficient.

$$\alpha = e^{\alpha_{wg}^{L/2}},$$

where $a_{wg}$ is the power loss coefficient of a waveguide and L is the length of resonator.

If waveguide loss is 10 dB/cm, $$\alpha_{wg} = 10^{-\frac{10\frac{dB}{cm}}{10}} = 0.1\frac{1}{cm}.$$

$$\theta = \frac{2\pi}{\lambda} n_{eff}(\lambda) L,$$

where $\lambda$ is wavelength and $n_{eff}(\lambda)$ is wavelength dependent waveguide effective index.

When the RRM's 6a and 6b are modulated, amplitude may be written as:

$$E_t = \frac{-\alpha + t e^{-i(\theta + \phi_{mod})}}{-\alpha t^* + e^{-i(\theta + \phi_{mod})}}$$

Wherein $\phi_{mod}$ is the phase controlled by the driver 11, $V_{pp}$, e.g. $\phi_{mod}$ V $d_{rv}/V_{pi}*\pi$ Since the amplitude is a complex number, essentially it may be represented by an magnitude and phase, i.e.

$$[[E_r = |E_r| e^{i\theta_{ring}}]]$$

$$E_t = |E_t| e^{i\theta_{ring}}$$

Combing the MZI transfer function, the MZI output amplitude may be readily written as $$E_{MZIRRM} = \frac{1}{2}(E_{t1} e^{i\phi_{static}} + E_{t2})$$

Re-written in magnitude and phase:

$$E_{MZIRRM} = \frac{1}{2}(|E_{t1}| e^{i\theta_{ring1}} e^{i\phi_{static}} + |E_{t2}| e^{i\theta_{ring2}})$$

Notations 1 and 2 represent ring 6a in top arm and ring 6b in bottom arm, respectively.

Under modulation, $$E_{MZIRRM} = \frac{1}{2}(|E_{t1}| e^{i(\theta_{ring1} + \phi_{RF1})} e^{i\phi_{static}} + |E_{t2}| e^{i(\theta_{ring2} + \phi_{RF2})})$$

Now consider a specific situation, both identical RRM's 6a and 6b are on resonance at the desired laser wavelength of the input optical signal, whereby the tunable roundtrip ring phase delay $\theta_{ring1} = \theta_{ring2} = 0$ or a multiple of $2\pi$. The bias scheme is defined as "null bias" since both RRM's 6a and 6b are on resonance with minimum output power.

Figure 3:
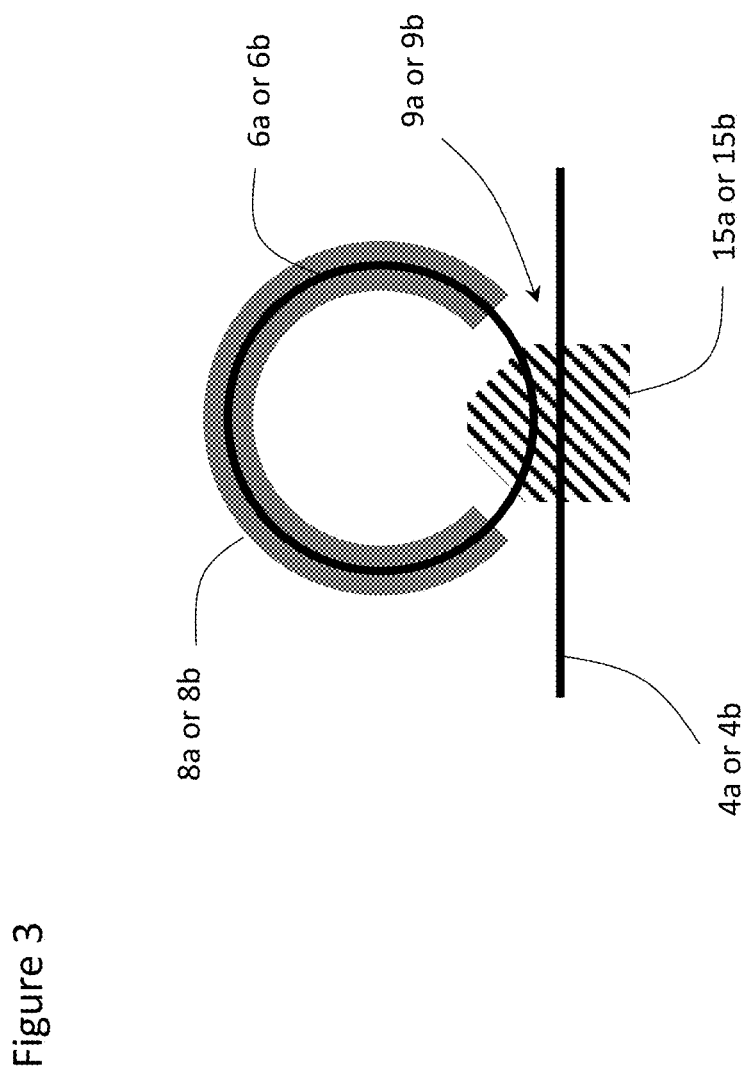
FIG. 3 is a schematic diagram of a ring resonator with a phase tuner of the device of FIG. 1.
Figure 4:
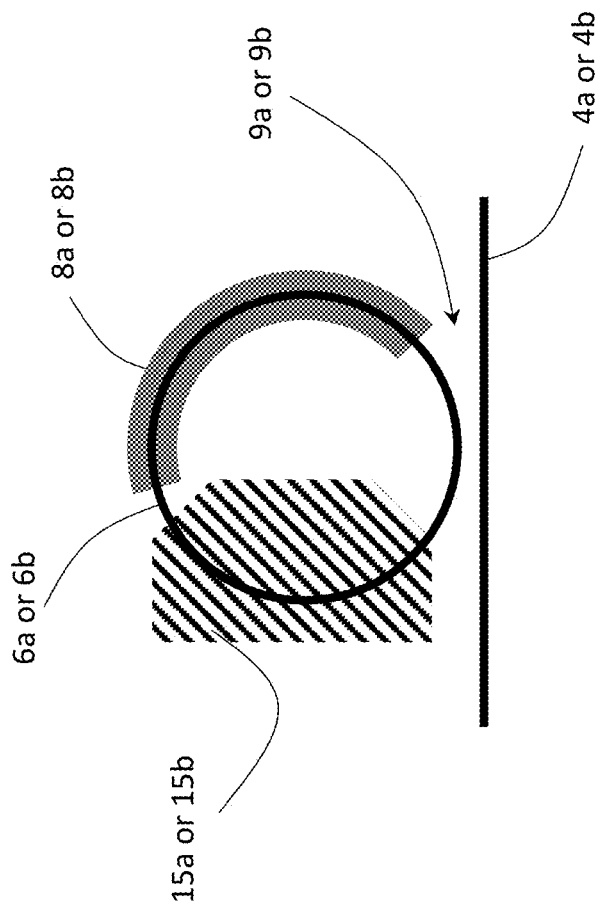
FIG. 4 is a schematic diagram of an alternative embodiment of a ring resonator with a phase tuner of the device of FIG. 1.
Figure 5A:
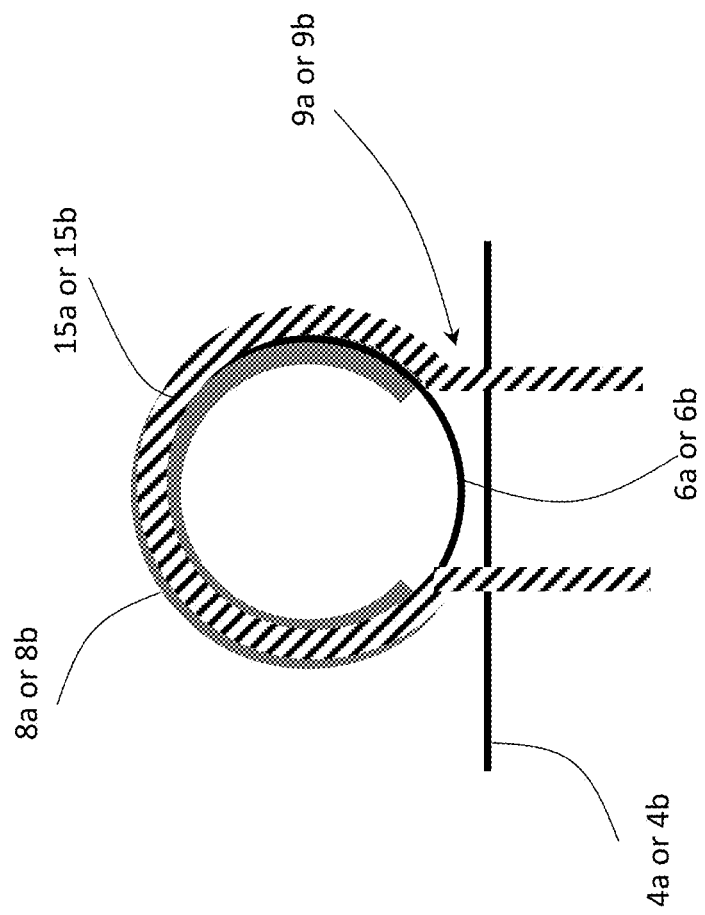
FIGS. 5a to 5c are schematic diagrams of another embodiment of the ring resonator with a phase tuner of the device of FIG. 1.
Figure 5B:
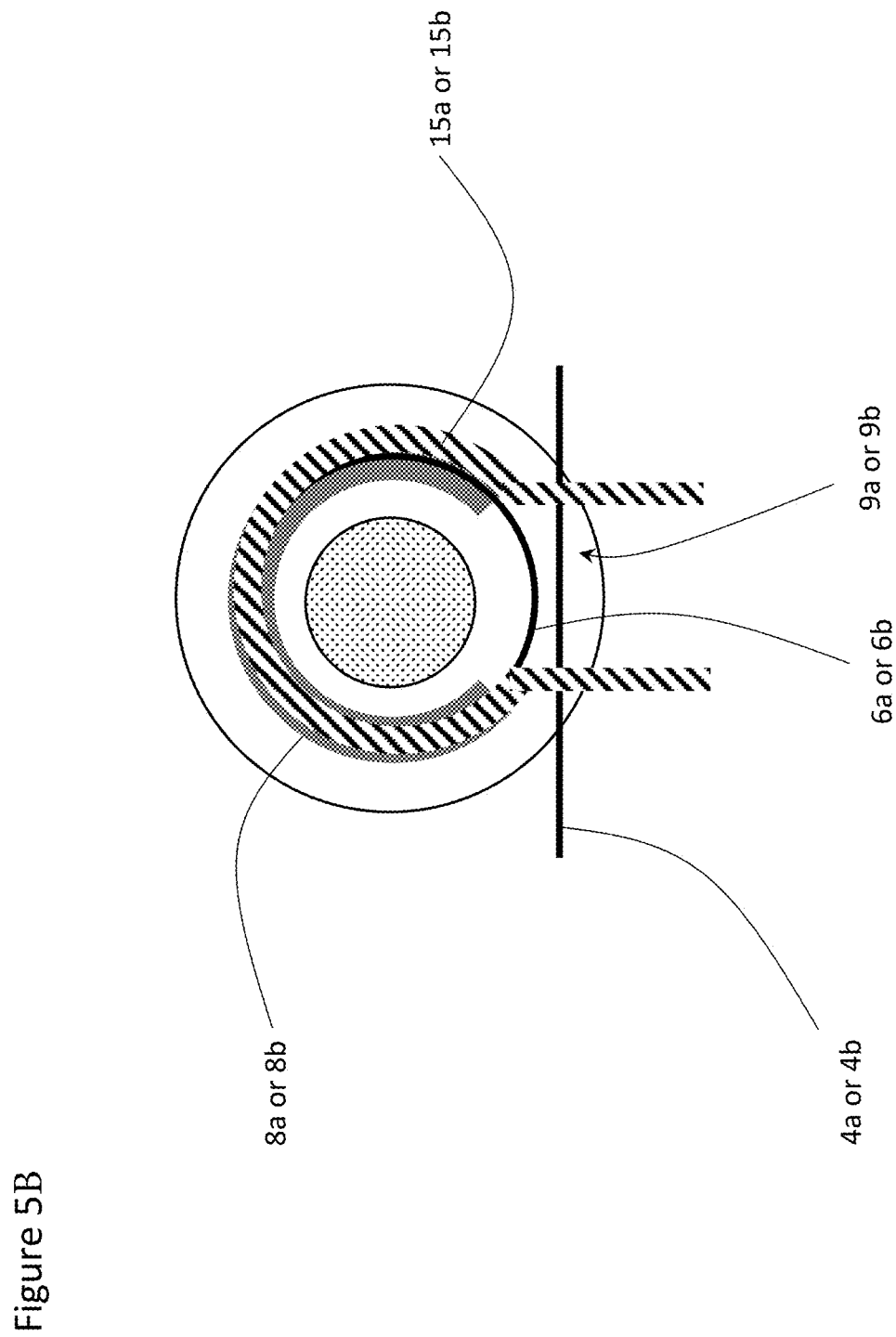
Figure 5C:
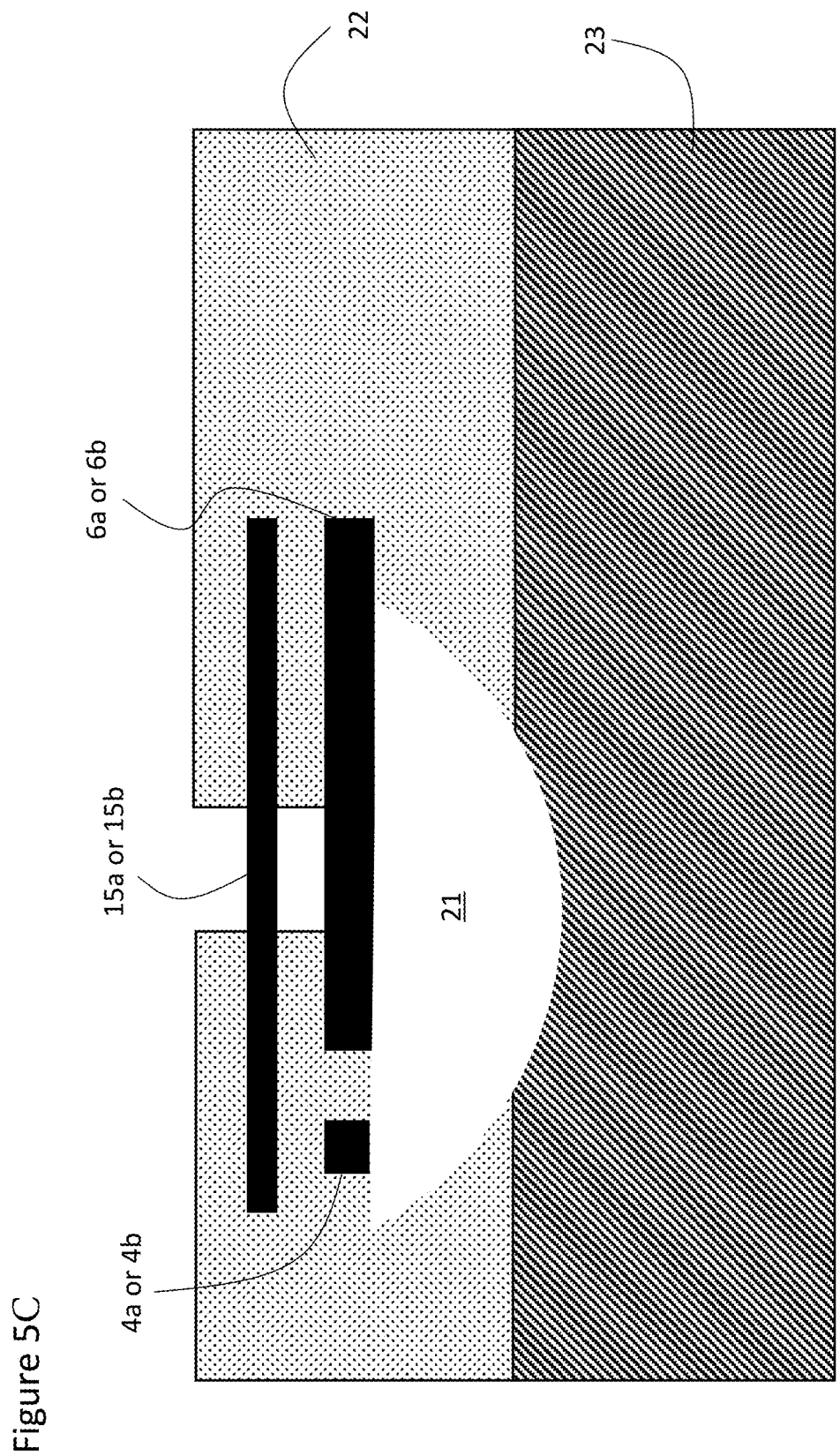

The tunable roundtrip phase delays, $\theta_{ring1}$ and $\theta_{ring2}$, for each RRM 6a and 6b, respectively, may be tuned by a phase, e.g. thermal, tuner structure 15a and 15b provided in each RRM 6a and 6b, respectively, typically to ensure that the RRM's 6a and 6b are both resonating at substantially the laser wavelength. Several variants of the phase tuners 15a and 15b are illustrated in FIGS. 3 to 5c. With reference to FIG. 3, the phase tuner structures 15a and 15b may be comprised of a doped resistive phase tuner covering the coupling region 9a and 9b, respectively, between the MZI arms 4a and 4b and the RRM's 6a and 6b. In the embodiment illustrated in FIG. 4, the phase tuners 15a and 15b may be comprised of a doped resistive thermal tuner covering a non-coupling region of the RRM's 6a and 6b. FIGS. 5a-5c illustrates that each of the phase tuners 15a and 15b may comprise a metal resistive thermal tuner on top of the resonator waveguide of each RRM 6a and 6b.

Moreover, with reference to FIGS. 5b and 5c, to improve thermal tuning efficiency, each RRM 6a and 6b with an integrated metal heater phase tuner 15a and 15b, may include an undercut region 21 provided, e.g. etched, in the cladding 22 surrounding the MZ arms 4a and 4b, and the RRM's 6a and 6b, e.g. between the metal heaters 15a and 15b and the RRM's 6a and 6b, respectively, and/or below the RRM's 6a and 6b. The undercut region 21 may even extend into the substrate region 23 supporting the cladding 22, the RRM's 6a and 6b, and the MZI arms 4a and 4b. The undercut regions 21 may be filled with air or some other filling material.

In a first example, when the two MZ arms 4a and 4b are out of phase, whereby the static phase difference between the two MZI arms 4a and 4b is $\phi_{static} = \pi$. A differential signal from the driver 11 drives the two RRM's 6a and 6b, whereby the ring driving phase differences $\phi_{mod1} = -\phi_{mod2}$, which results in RF ring phase biases $\phi_{RF1} = -\phi_{RF2}$, e.g. $\pi/2$ and $-\pi/2$. Accordingly, this case is suitable for coherent modulation.

FIG. 6 illustrates the response of a MZIRRM 1 as the sweeping driving phase, $\phi_{RF}$, ranges from $-0.45\pi$ to $+0.45\pi$. The parameters used for the RRM's 6a and 6b in the simulation are: power coupling coefficient $k^2 = 0.4$, waveguide loss=30 dB/cm and radius=20 um.

Figure 6A:
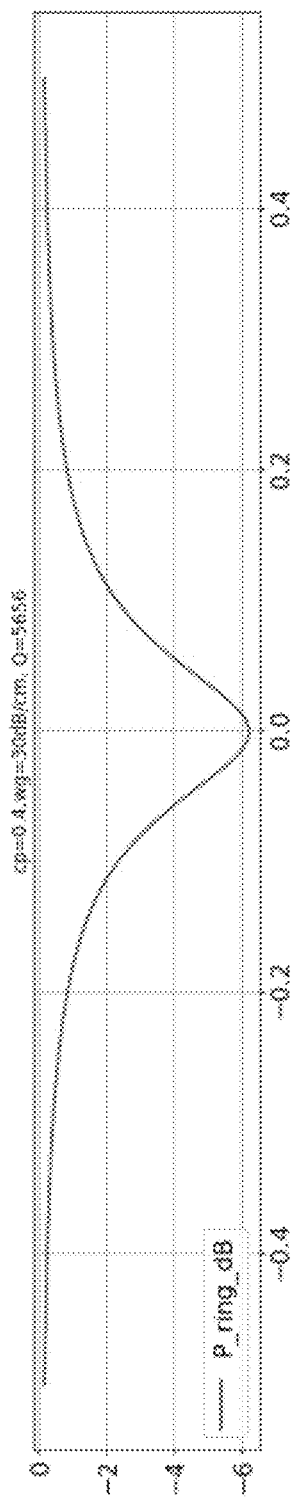
FIG. 6a is a plot of RF phase (π) vs. Power (dB) of the ring resonator of the device of FIG. 1.
Figure 6B:
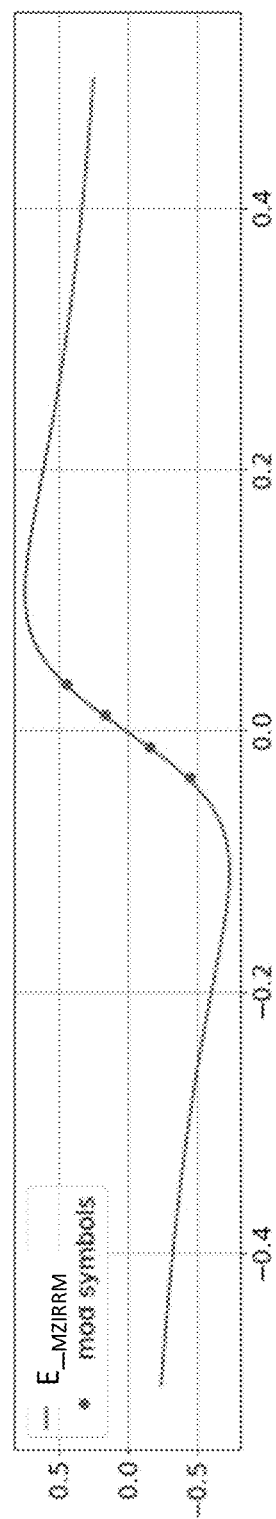
FIG. 6b is a plot of RF phase (π) vs amplitude of the device of FIG. 1.
Figure 6C:
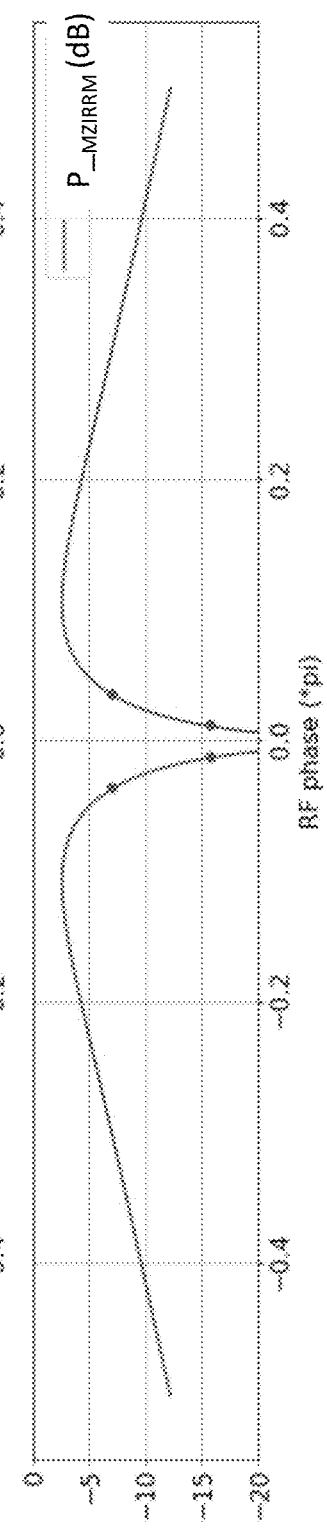
FIG. 6c is a plot of RF phase (π) vs power (dB) of the device of FIG. 1.

The top plot in FIG. 6a illustrates the power of a single RRM ring 4a or 4b vs the driving phase $\phi_{mod}$ of the driver 11. The second plot (FIG. 6b) illustrates the amplitude of the MZIRRM 1 (curve) vs the driving phase $\phi_{mod}$. The transition in the middle plot for RF phase between $-0.1\pi$ and $+0.1\pi$, is linear, which makes the MZIRRM 1 suitable for multi-level phase modulation. As an example, the second plot (FIG. 6b) also shows modulation symbols when driven by a 4PSK signal (dots). The third plot (FIG. 6c) is power response and 4PSK symbols of the MZIRRM 1.

Figure 7A:
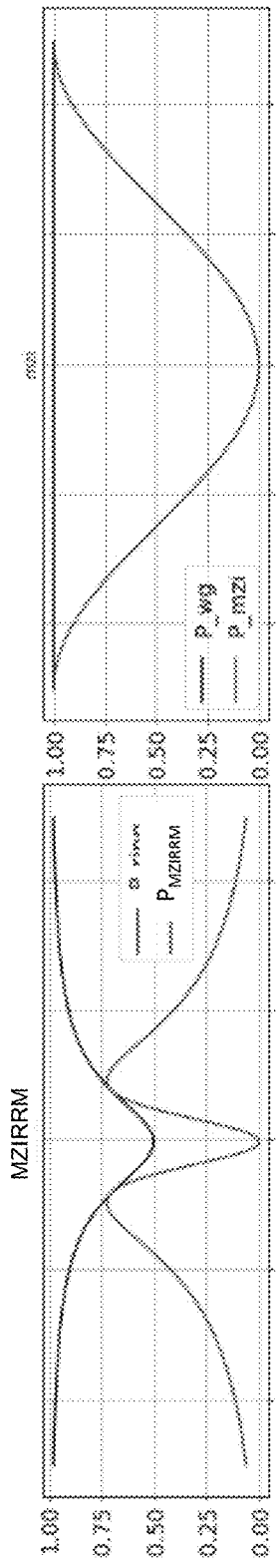
FIG. 7a is a comparison of power output vs RF phase for the ring resonator and the MZI of the MZIRRM of FIG. 1, and for the MZI and waveguide of a conventional MZI.
Figure 7B:
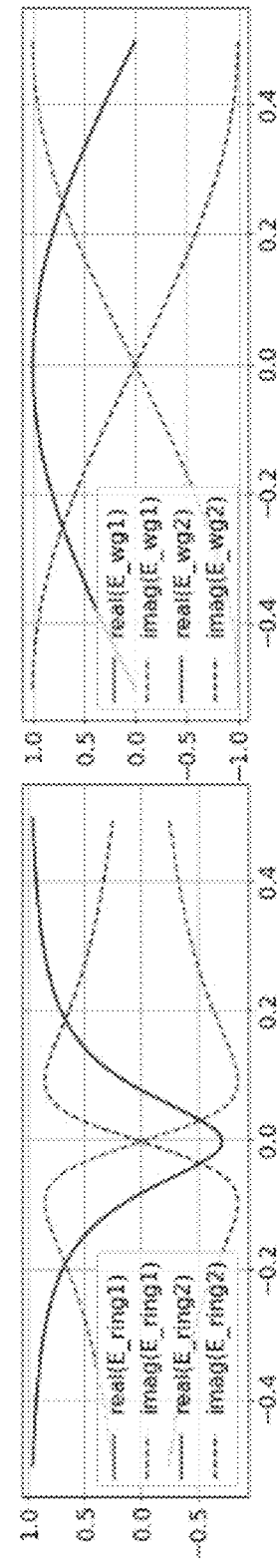
FIG. 7b is a comparison of the real and imaginary parts of the optical amplitudes vs phase for the ring resonators in the MZIRRM of FIG. 1 and a conventional MZI.
Figure 7C:
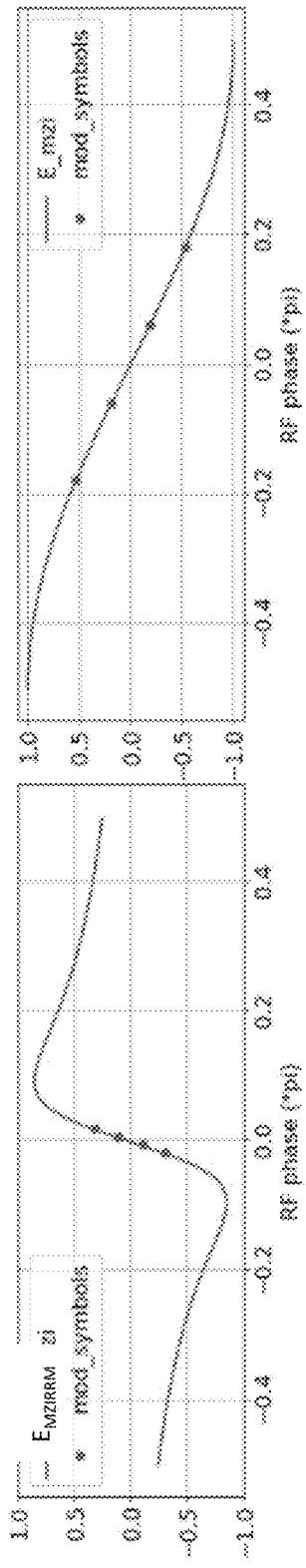
FIG. 7c is a comparison of the power output vs RF phase for the MZIRRM of FIG. 1 and a conventional MZI.

With reference to FIG. 7, to better understand the linearity of a "null bias" MZIRRM 1, we compare the RRM 6a or 6b (on the left) to an MZI (on the right). Each RRM 6a and 6b can be analogous to a special waveguide with modulation in both real and imaginary parts, just like a waveguide. Like an MZI, which is characterized by a power dip (top right plot in FIG. 7a), the "null bias" MZIRRM also shows a power dip that is centered on the RF modulation phase, but much narrower, e.g. between $-0.1\pi$ and $+0.1\pi$. If we compare the real and imaginary parts of the optical amplitudes of the MZIRRM 1 and the MZI (middle plots FIG. 7b), the real parts (solid lines) of the two RRM 6a and 6b, and the real parts of the two arms 4a and 4b overlap, while the imaginary parts (dotted lines) are opposite for both the MZIRRM 1 and the MZI. One of the MZ arms 4a or 4b comes through an extra static phase difference, $\phi_{static}=\pi$, whereby the real parts are now opposite while the imaginary parts overlap. After MZI combining, the real parts cancel out and only the imaginary parts remain, which leaves a linear region at the center (bottom left plot in FIG. 7c). Because there is no real part, the symbol transition in a complex domain is linear, which makes the "null bias" MZIRRM 1 suitable for multi-level modulation.

Figure 8:
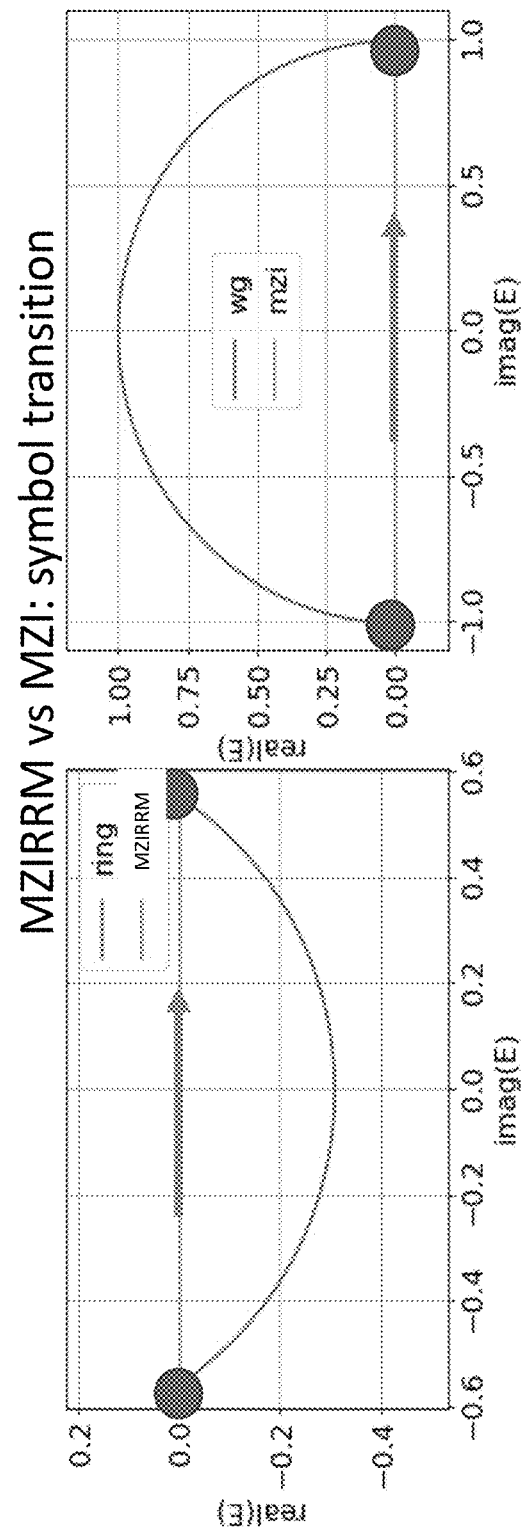
FIG. 8 is a comparison of symbol transition for a BPSK MZIRRM and a conventional BPSK MZI.
Figure 9:
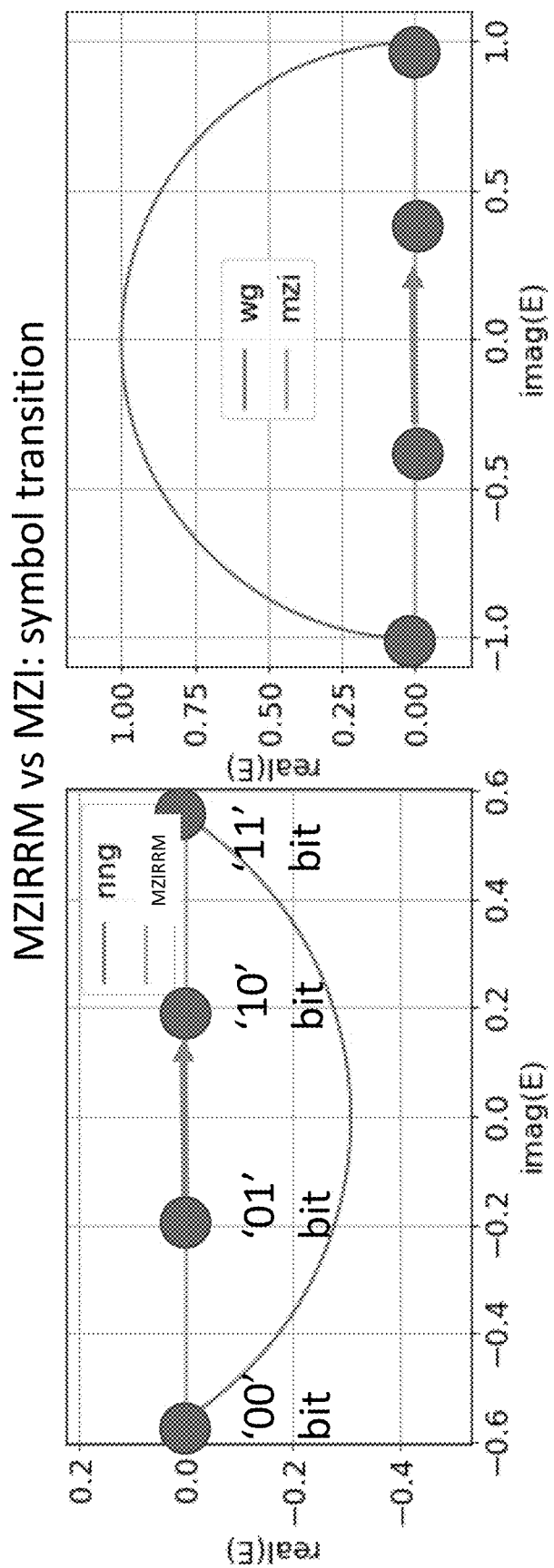
FIG. 9 is a comparison of symbol transition for a 4PSK MZIRRM and a conventional 4PSK MZI.

FIG. 8 illustrates a comparison of a symbol transition of a BPSK signal in a complex domain between the MZIRRM 1 and a MZI. The MZIRRM provides a very linear transition between '0' bit and '1' bit compared to a single RRM (left), just as an MZI provides a very linear transition compared to a waveguide. Compared to a single ring, the MZIRRM 1 does not present a real part during the transition. Similarly, FIG. 9 illustrates a symbol transition of a 4PSK signal, which is linear for the MZIRRM 1.

In a second example, in which the phase difference of two MZ arms 4a and 4b may be, $\phi_{static}=\pi/2$. A differential signal drives the two rings at a phase bias of, $\phi_{mod1}=-\phi_{mod2}$, which results in a driving RF phase difference of $\phi_{RF1}=-\phi_{RF2}$, e.g. $\pi/2$ and $-\pi/2$. Accordingly, this example is suitable for intensity modulation.

Figure 10:
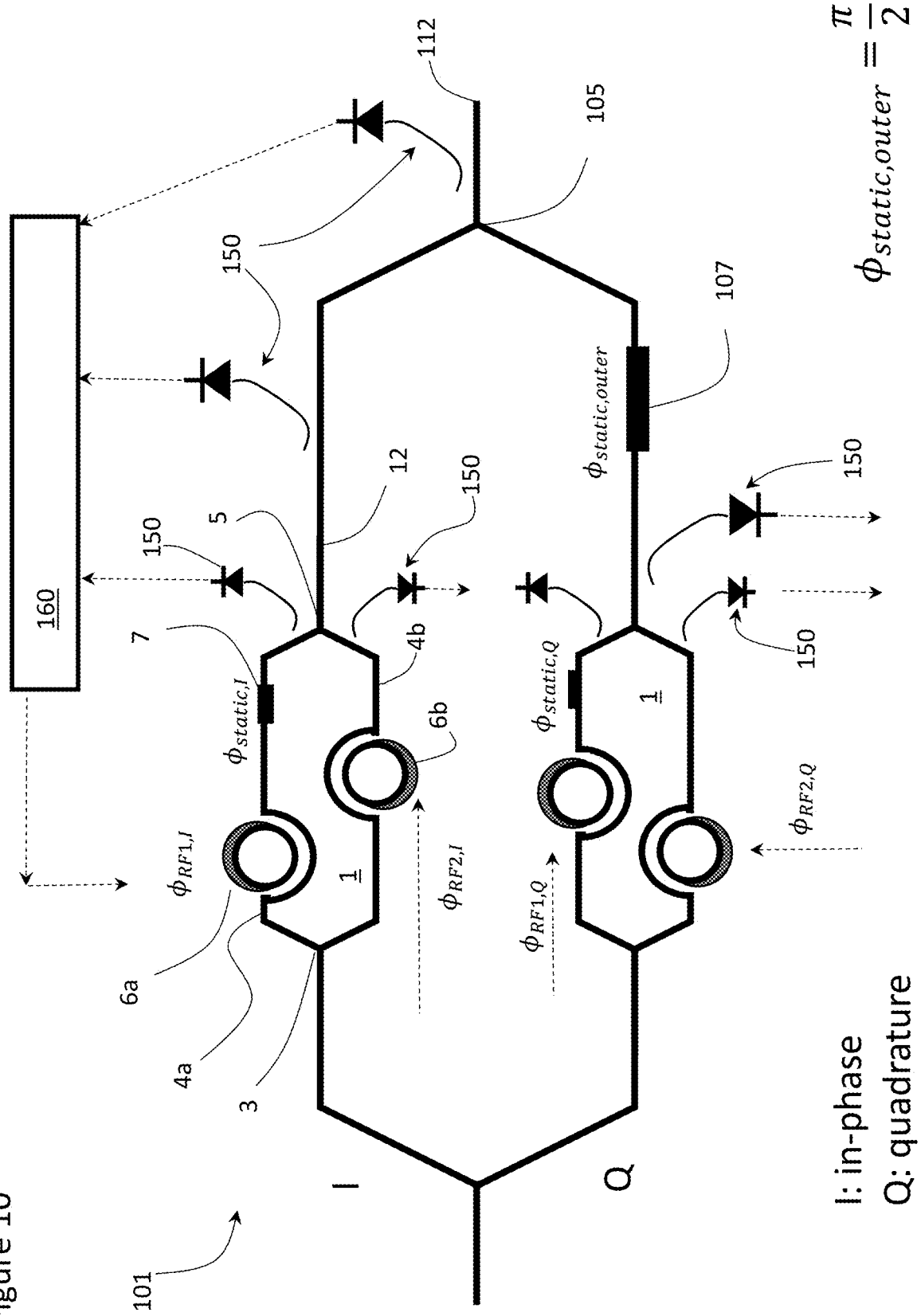
FIG. 10 is a schematic diagram of a coherent (IQMZ) MZIRRM.
Figure 11:
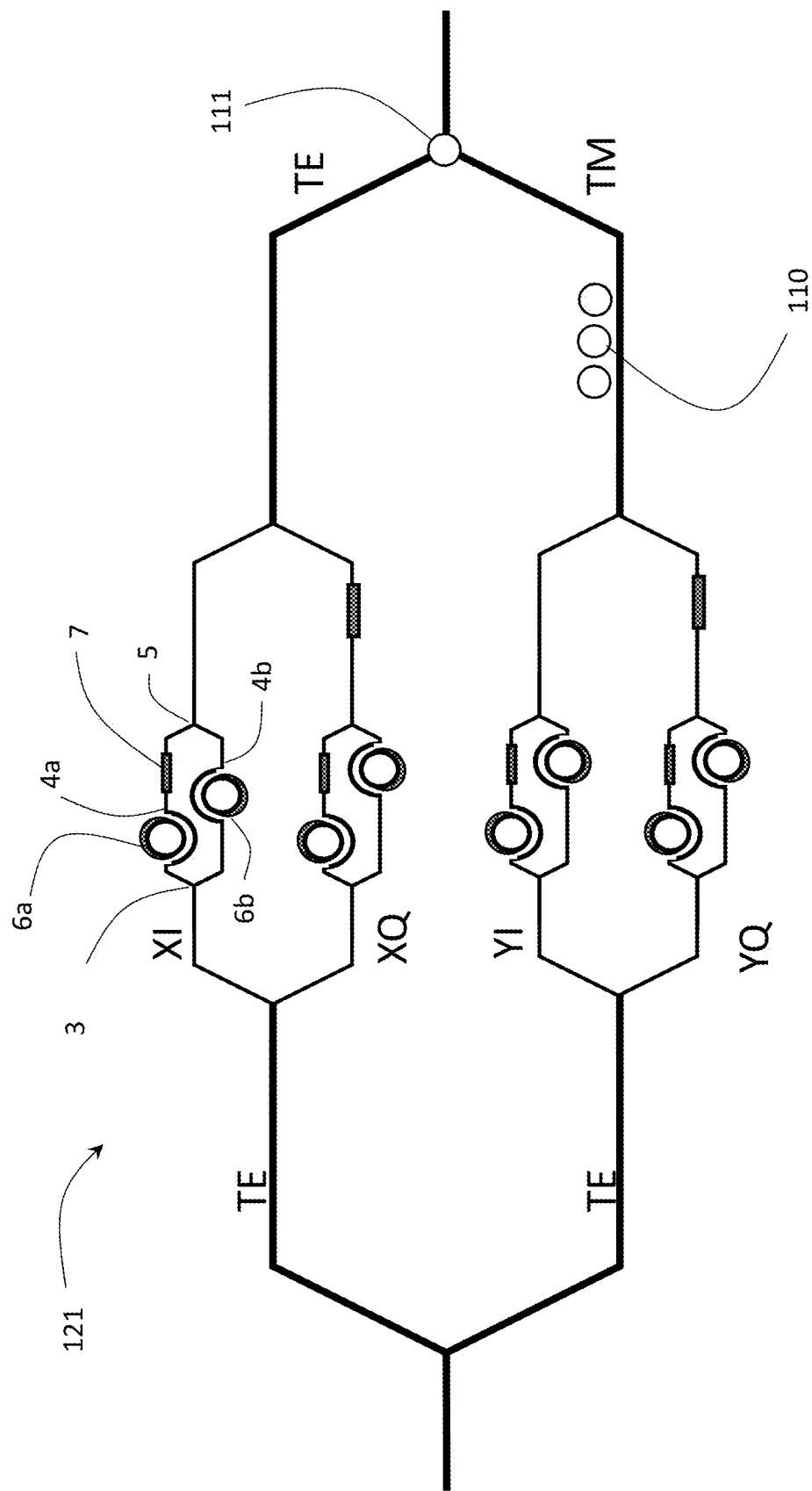
FIG. 11 is a schematic diagram of a coherent (DP-IQMZ) MZIRRM.

With reference to FIGS. 10 and 11, a plurality of the MZIRRM 1 of the present invention may also be used in more complicated coherent modulating schemes, e.g. IQMZ (FIG. 10) and DP-IQMZ (FIG. 11). For the IQMZ modulator 101 (FIG. 10), the input signal is first split into I (in-phase) and Q (quadrature) components, and then each of the I and Q components are split again into sub-beams for modulation, as hereinbefore discussed with reference to FIG. 1. An additional static phase difference $\phi_{static, outer}$ 107 is provided in one of the I or Q arms providing a phase difference, e.g. $\pi/2$, between the I and the Q components. An IQ combiner 105 is coupled to each of the I and Q arms for combining the I and Q components for transmission via the main output 112 For the DP-IQMZ modulator 121 (FIG. 11), the input beam is first separated into first and second polarization components X and Y, then each polarization component is divided into I and Q components, e.g. XI, XQ, YI and YQ, and then each XI, XQ, YI and YQ component is split into sub-beams for modulation, as hereinbefore discussed with reference to FIG. 1. The additional static phase difference $\phi_{static, outer}$ 107 is provided in each I and Q component section. A polarization rotator 110 is provided to rotate the polarization of one of the polarization components X and Y to a polarization orthogonal to the other, and a polarization combiner 111 is provided to combine the polarization components together for output.

For all MZIRRM's 1, 101, 121 etc. monitoring taps 150 may be provided in each of the MZI arms 4a and 4b, at each of the outputs 12, i.e. the I and Q arms, and at the main output 112. Each monitoring tap 150 may comprise a tap for tapping a small percentage e.g. <5%, of the signal, and a photodetector for measuring the tapped light. Data from the monitoring taps 150, e.g. power or a small sinusoidal signal at low frequency, may be transmitted to one or more controllers 160 to enable active and coordinated tuning of the thermal tuners 15a and 15b, with control signals, illustrated as dashed lines to ensure the RRM's 6a and 6b are resonating at the laser wavelength.

Figure 12A:
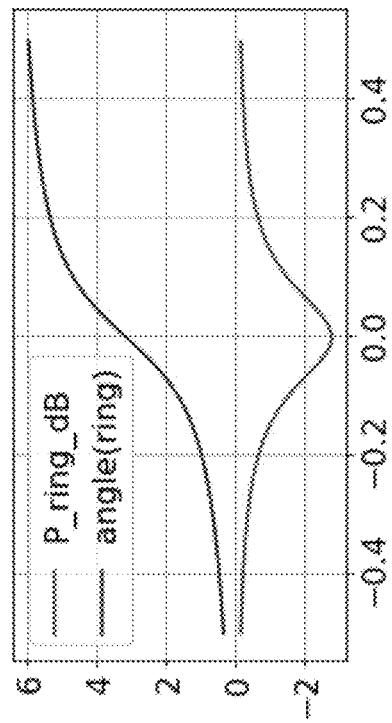
FIG. 12a is plot of RF phase (π) vs power (dB) for the ring resonator using a BPSK drive scheme.

FIG. 12a illustrates an example MZIRRM 1 in which the sweeping driving phase, $\phi_{RF}$, ranges from $-0.45\pi$ to $+0.45\pi$. The ring parameters for the RRM's 6a and 6b used in the simulation are: power coupling coefficient $k^2=0.5$, waveguide loss=30 dB/cm and radius=25 um.

Figure 12C:
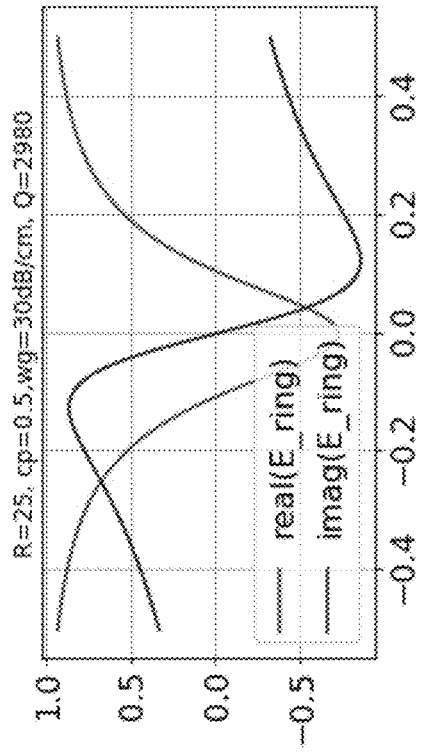
FIG. 12c is a plot of RF phase (π) vs power ( ) for a ring resonator using a BPSK drive scheme.
Figure 12B:
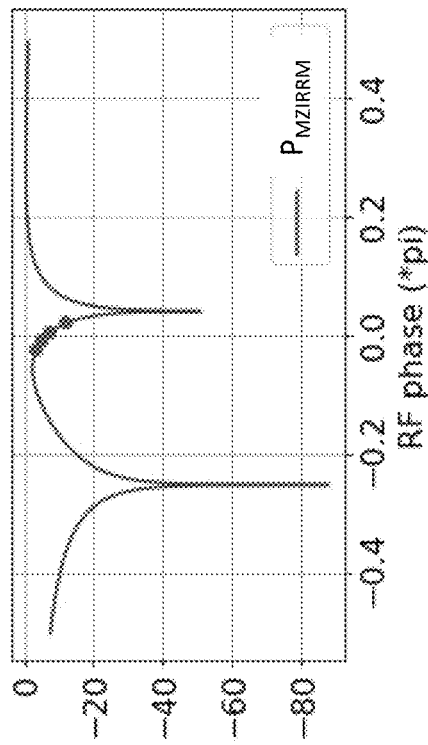
FIG. 12b is a plot of RF phase (π) vs power ( ) for the MZIRRM using a BPSK drive scheme.
Figure 12D:
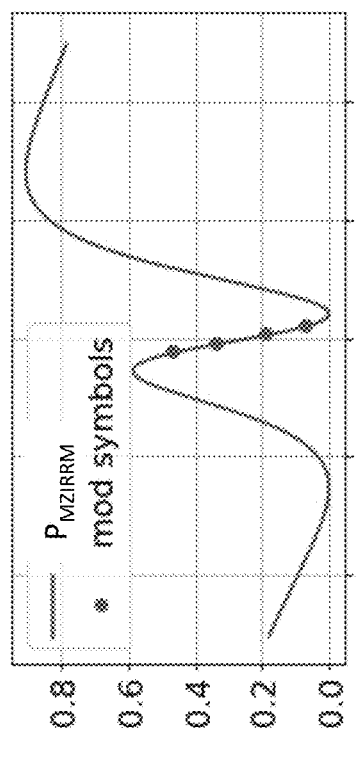
FIG. 12d is a plot of RF phase (π) vs power (dB) for the MZIRRM using a BPSK drive scheme.

From top right plot in FIG. 12c, the RRM 4a or 4b is highly over coupled. The output power shows a linear response region around 0 RF phase, which makes it suitable for amplitude modulation. The bottom left figure (FIG. 12b) shows the modulation symbols when driving with a PAM4 signal.

Figure 13A:
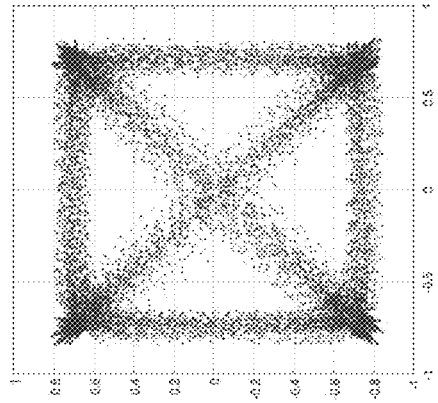
FIG. 13(a) is the QPSK constellation with transition traces for the MZIRRM of the present invention.
Figure 13B:
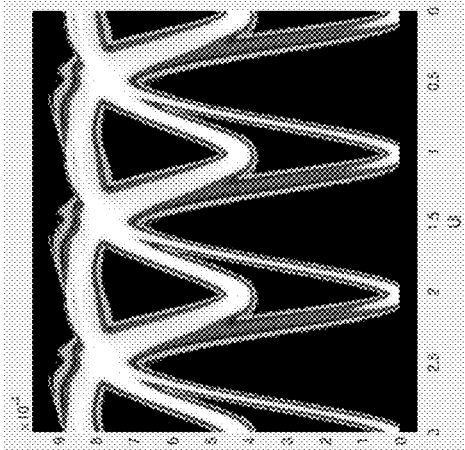
FIG. 13(b) illustrates a QPSK direct eye diagram for the MZIRRM of the present invention.
Figure 13C:
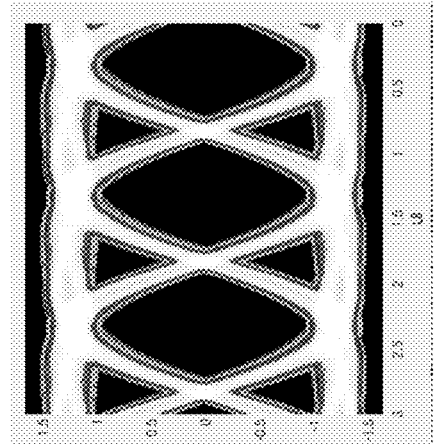
FIG. 13(c) illustrates a de-modulated eye diagram at a coherent receiver.
Figure 14:
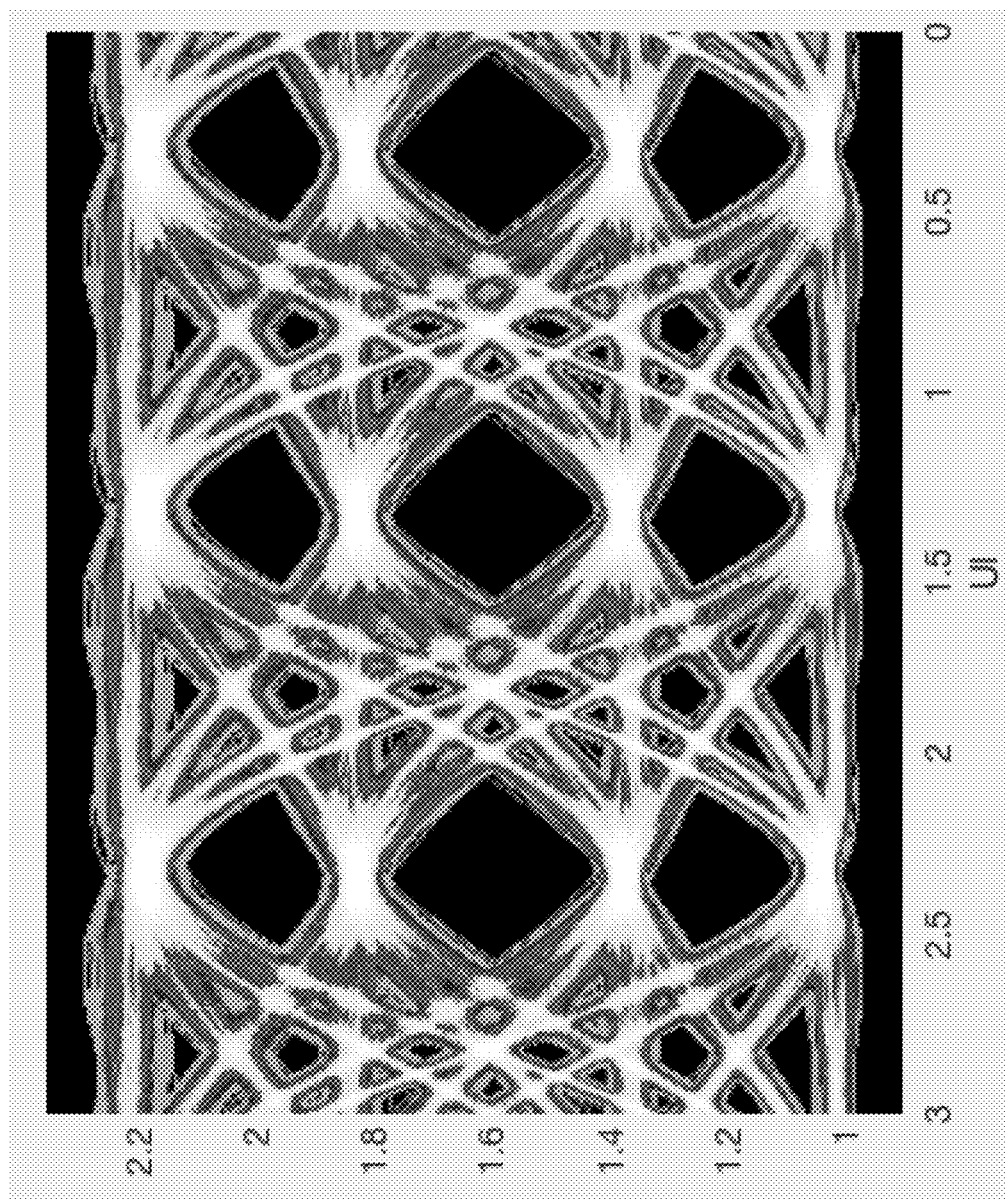
FIG. 14 illustrates a PAM4 eye diagram generated using a MZIRRM.
Figure 15:
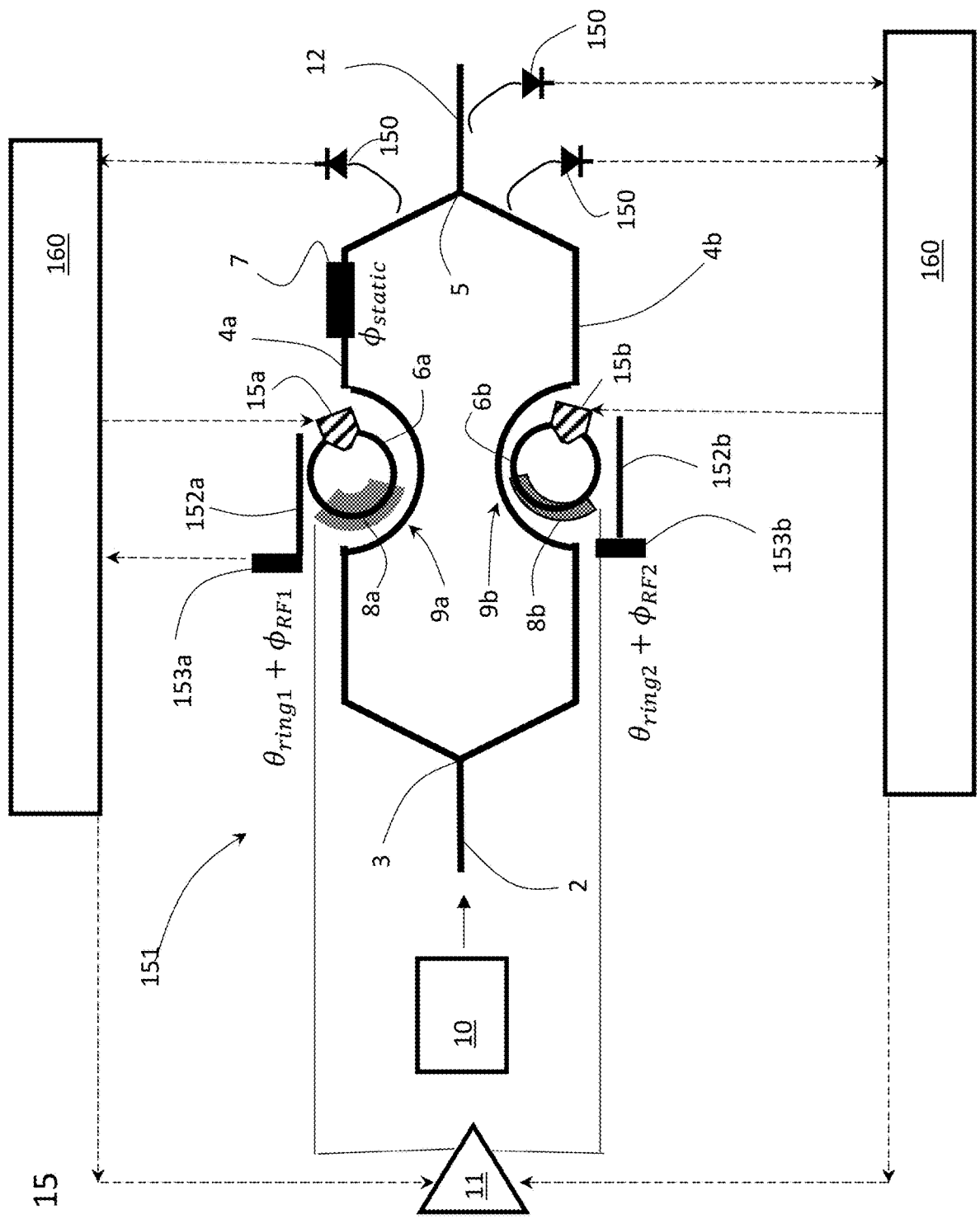
FIG. 15 is a schematic diagram of an alternative embodiment of an MZIRRM.

A real data transmission simulation was performed, and FIG. 13 illustrates QPSK modulation when a IQMZ comprises MZIRRM structures. FIG. 13(a) is the QPSK constellation with transition traces, which shows linear transitions between different symbols at the four corners of the square. FIG. 13(b) illustrates a QPSK direct eye diagram, and FIG. 13(c) illustrates a de-modulated eye diagram at a coherent receiver. FIG. 14 illustrates a PAM4 eye diagram generated using a MZIRRM 1.

With reference to FIGS. 15 to 20, the single bus single RRM 6a and 6b may be replaced by a more complicated RRM structure. An MZIRRM 151, illustrated in FIG. 15, includes all the elements of the MZIRRM 1, except each of the RRM's 6a and 6b also includes a bus waveguide 152a and 152b, respectively, optically coupled thereto opposite the MZI arms 4a and 4b. Monitor photodiodes 153a and 153b may be provided for measuring the light that escapes the RRM's 6a and 6b, respectively. A control system may use the information from the monitor photodiodes 153a and 153b for tuning the resonance of the RRM's 6a and 6b.

Figure 16:
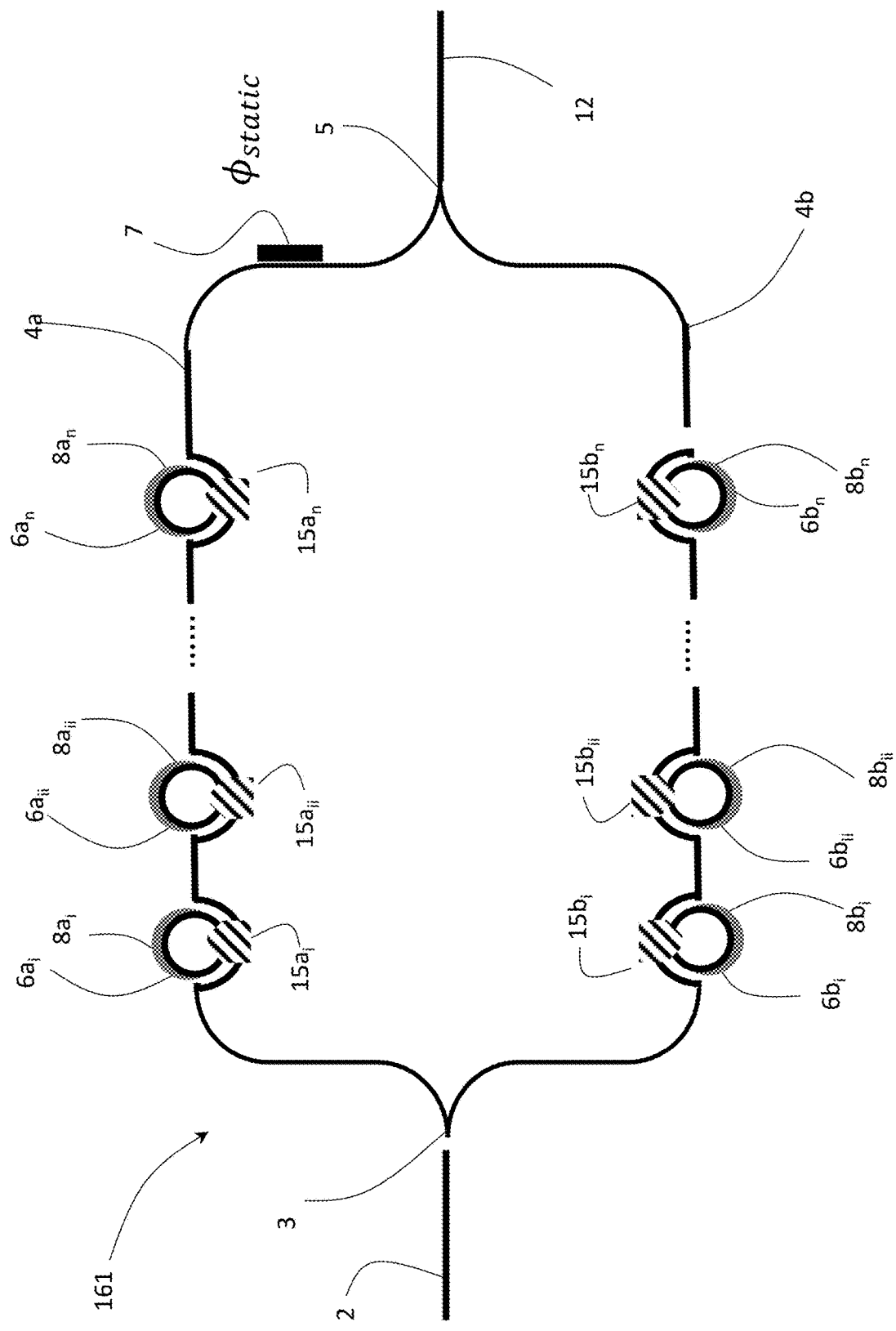
FIG. 16 is a schematic diagram of an alternative embodiment of an MZIRRM with a series of ring resonators coupled along each arm.

An MZIRRM 161, illustrated in FIG. 16, includes all of the elements of the MZIRRM 1, except that each of the RRM's 6a and 6b includes a plurality of cascaded parallel rings $6a_i$ to $6a_n$ and $6b_i$ to $6b_n$ each one coupled to the corresponding MZI arm 4a and 4b, and each one including their own phase tuner $15a_i$ to $15a_n$ and $15b_i$ to $15b_n$ and phase modulation section $8a_i$ to $8a_n$ and $8b_i$ to $8b_n$. The cascaded rings $6a_i$ to $6a_n$ and $6b_i$ to $6b_n$ may provide a greater overall phase shift and/or control. All of the rings $6a_i$ to $6a_n$ and $6b_i$ to $6b_n$ may be identical or only the corresponding RRM's, e.g. $6a_i$ with, $6b_i$, $6a_n$ with $6b_n$, may be identical. The size, e.g. radius or length, of each ring $6a_i$ to $6a_n$ and $6b_i$ to $6b_n$ may gradually increase or decrease or simply alternate. All of the rings $6a_i$ to $6a_n$ and $6b_i$ to $6b_n$ may be modulated by the driver 11 or only a selected subset thereof. Each RRM $6a_i$ to $6a_n$ may have a different FSR.

Figure 17:
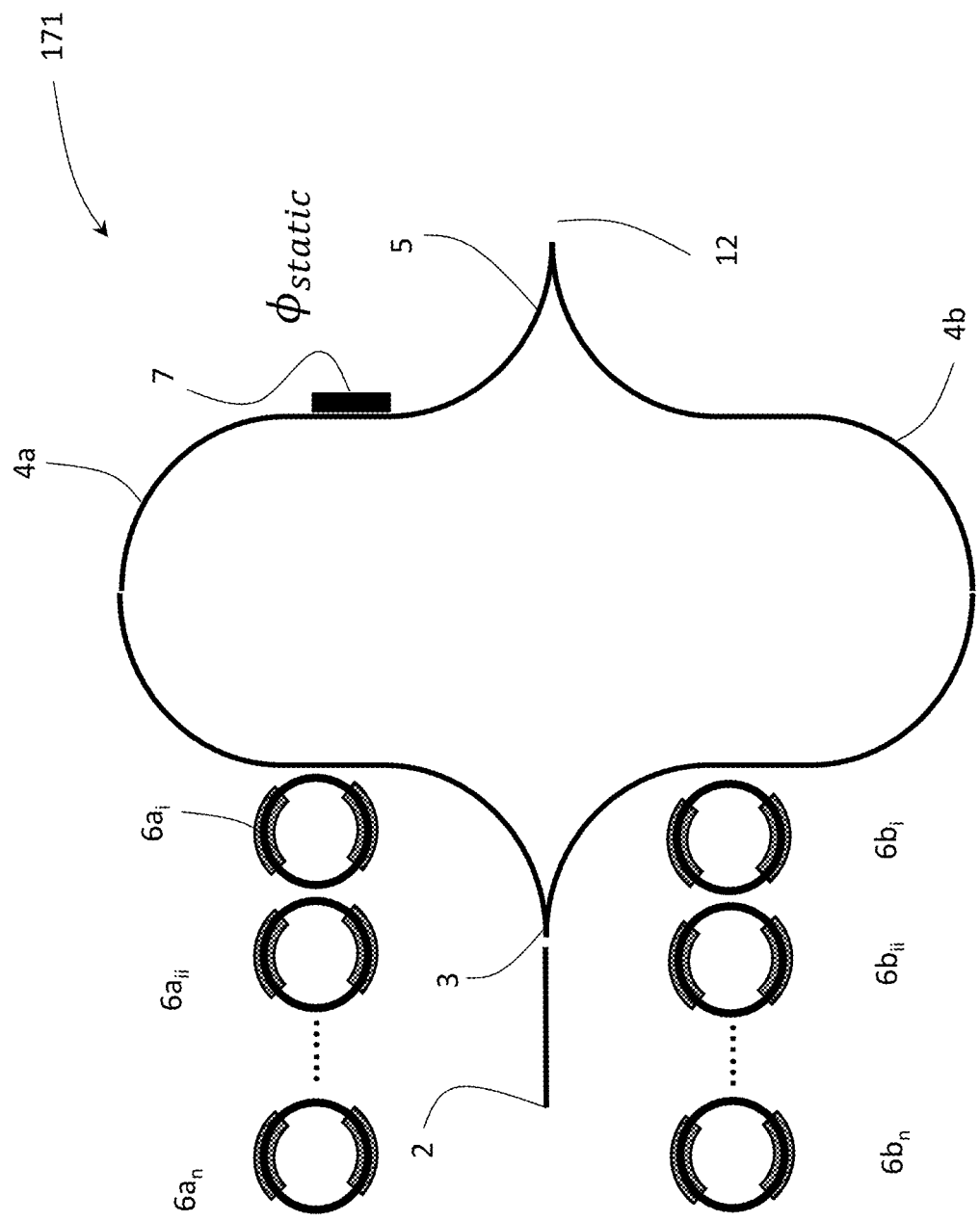
FIG. 17 is a schematic diagram of an alternative embodiment of an MZIRRM with a series of ring resonators coupled together to each arm.

An MZIRRM 171, illustrated in FIG. 17, includes all of the elements of the MZIRRM 1, except that each of the RRM's 6a and 6b includes a plurality of series rings $6a_i$ to $6a_n$ and $6b_i$ to $6b_n$ each one optically coupled to the previous and subsequent ring, except for the first ring $6a_i$, which is optically coupled to the MZI arm 4a, and the last ring $6a_n$, which is only coupled to the subsequent ring, and each one including their own phase tuner and phase modulation section. The series rings $6a_i$ to $6a_n$ and $6b_i$ to $6b_n$ may increase the delay in each RRM, which may help drive the efficiency. All of the rings $6a_i$ to $6a_n$ and $6b_i$ to $6b_n$ may be identical or only the corresponding RRM's, e.g. $6a_i$ with $6b_i$, $6a_n$ with $6b_n$, may be identical. The size, e.g. radius or length, of each ring $6a_i$ to $6a_n$ and $6b_i$ to $6b_n$ may gradually increase or decrease or simply alternate. All of the rings $6a_i$ to $6a_n$ and $6b_i$ to $6b_n$ may be modulated by the driver 11 or only a selected subset thereof.

Figure 18:
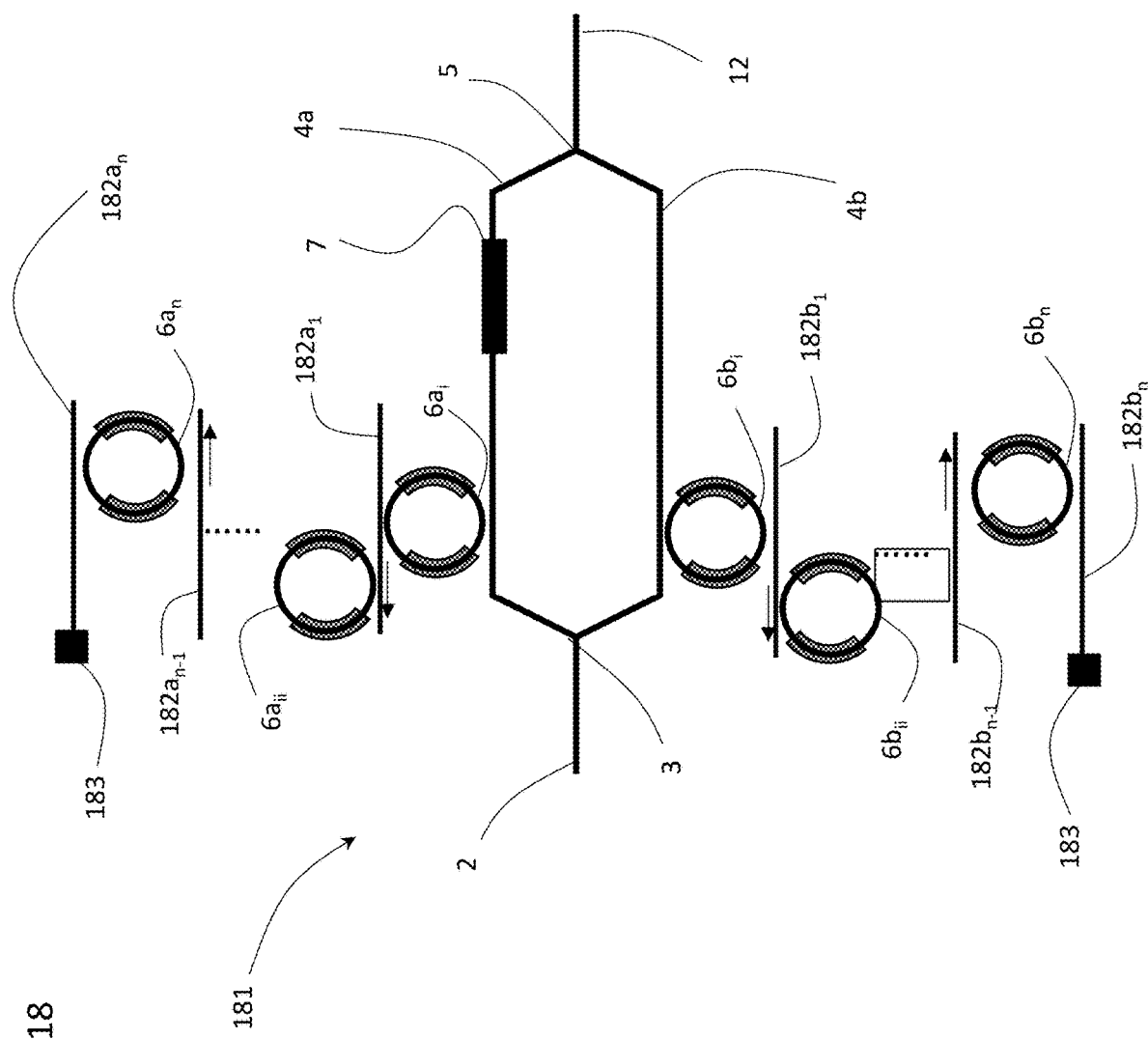
FIG. 18 is a schematic diagram of an alternative embodiment of an MZIRRM with a series of ring resonators coupled together by bus waveguides.

An MZIRRM 181, illustrated in FIG. 18, includes all of the elements of the MZIRRM 1, except that each of the RRM's 6a and 6b includes a plurality of series rings $6a_i$ to $6a_n$ and $6b_i$ to $6b_n$ each one optically coupled to the previous and subsequent ring by bus waveguides $182a_i$ to $182a_n$ and $182b_i$ to $182b_n$, except for the first rings $6a_i$ and $6b_i$, which are optically coupled to the MZI arms 4a and 4b, respectively, and the last rings $6a_n$ and $6b_n$, which are only coupled to the subsequent ring, and each one including their own phase tuner and phase modulation section (not shown). The final bus waveguides $182a_n$ and $182b_n$ may be terminated by a reflector 183, e.g. a Sagnac loop or reflective surface, for reflecting the light back through the rings $6a_i$ to $6a_n$ and $6b_i$ to $6b_n$. All of the rings $6a_i$ to $6a_n$ and $6b_i$ to $6b_n$ may be identical or only the corresponding RRM's, e.g. $6a_i$ with $6b_i$, $6a_n$ with $6b_n$, may be identical. The size, e.g. radius or length, of each ring $6a_i$ to $6a_n$ and $6b_i$ to $6b_n$ may gradually increase or decrease or simply alternate. All of the rings $6a_i$ to $6a_n$ and $6b_i$ to $6b_n$ may be modulated by the driver 11 or only a selected subset thereof. Bus waveguides make the RRM's 6a and 6b easier to design and monitor than a series of coupled rings.

Figure 19:
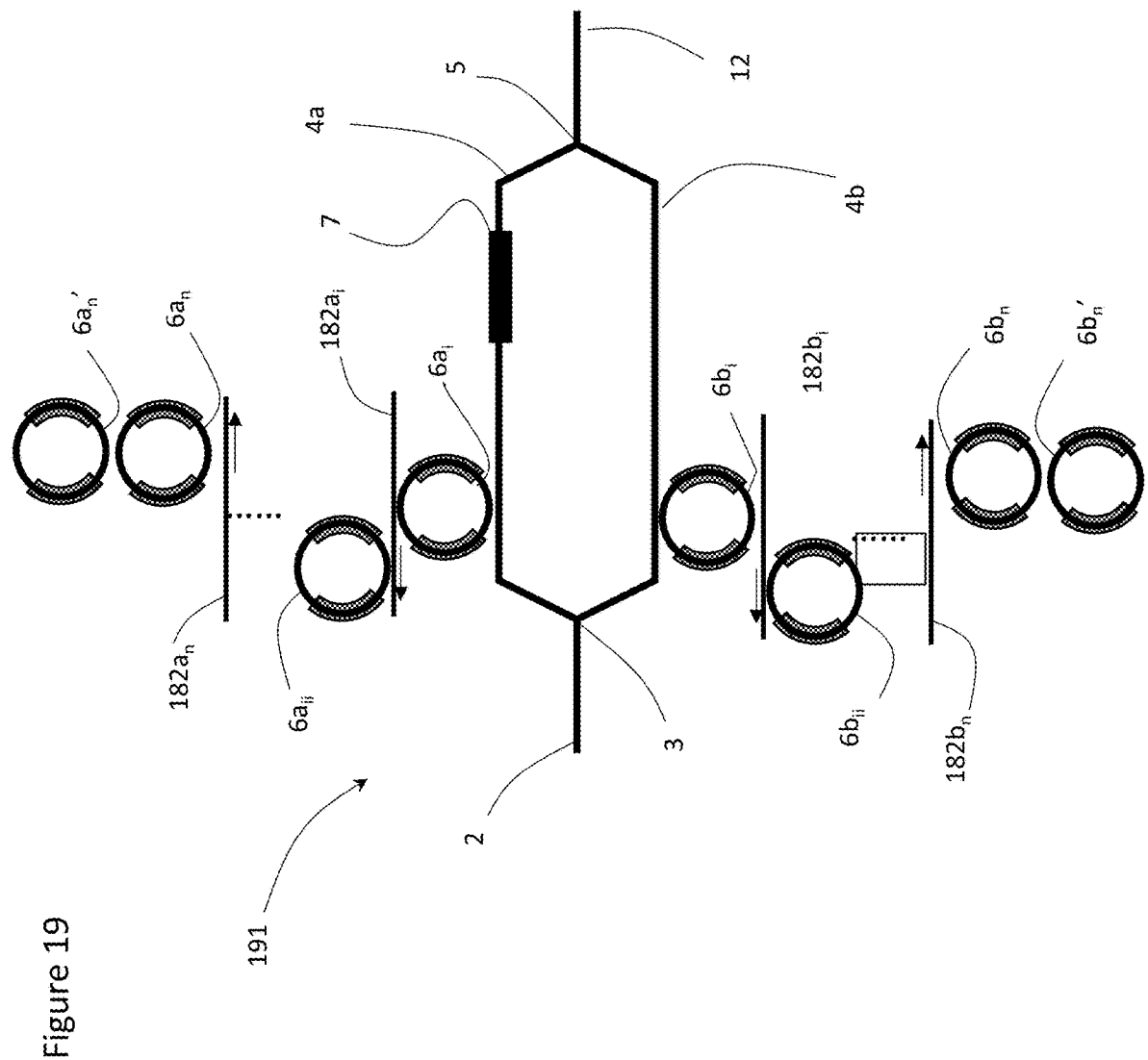
FIG. 19 is a schematic diagram of an alternative embodiment of an MZIRRM with a series of ring resonators coupled together to each arm by bus waveguides.

An MZIRRM 191, illustrated in FIG. 19, is identical to the MZIRRM 181, except that the reflectors 183 are replaced by a dual coupled ring $6a_n'$ and $6b_n'$ for redirecting the light back through the previous rings $6a_i$ to $6a_n$ and $6b_i$ to $6b_n$.

Figure 20:
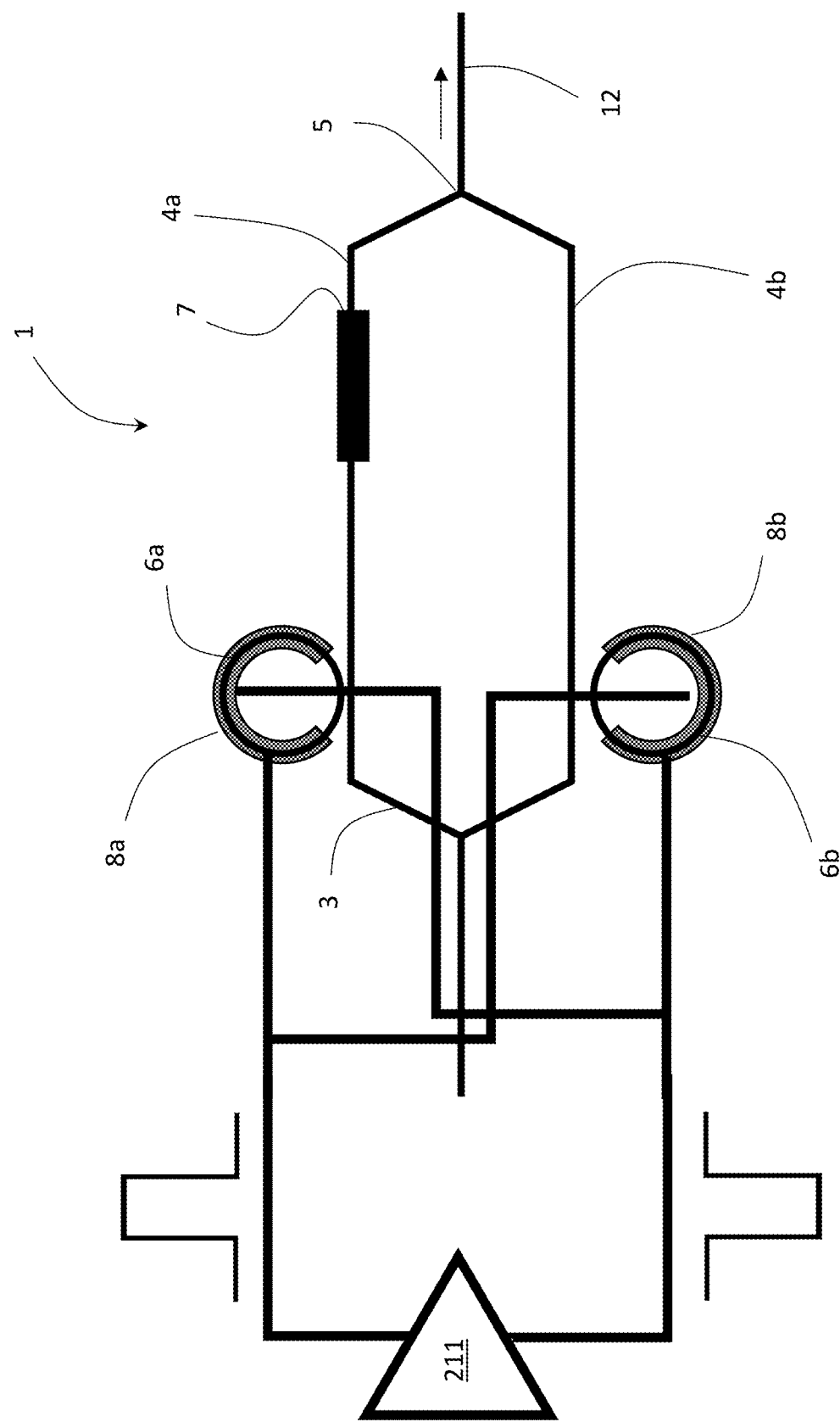
FIG. 20 is a schematic diagram of an alternative embodiment of an MZIRRM with a dual differential driver.
Figure 21:
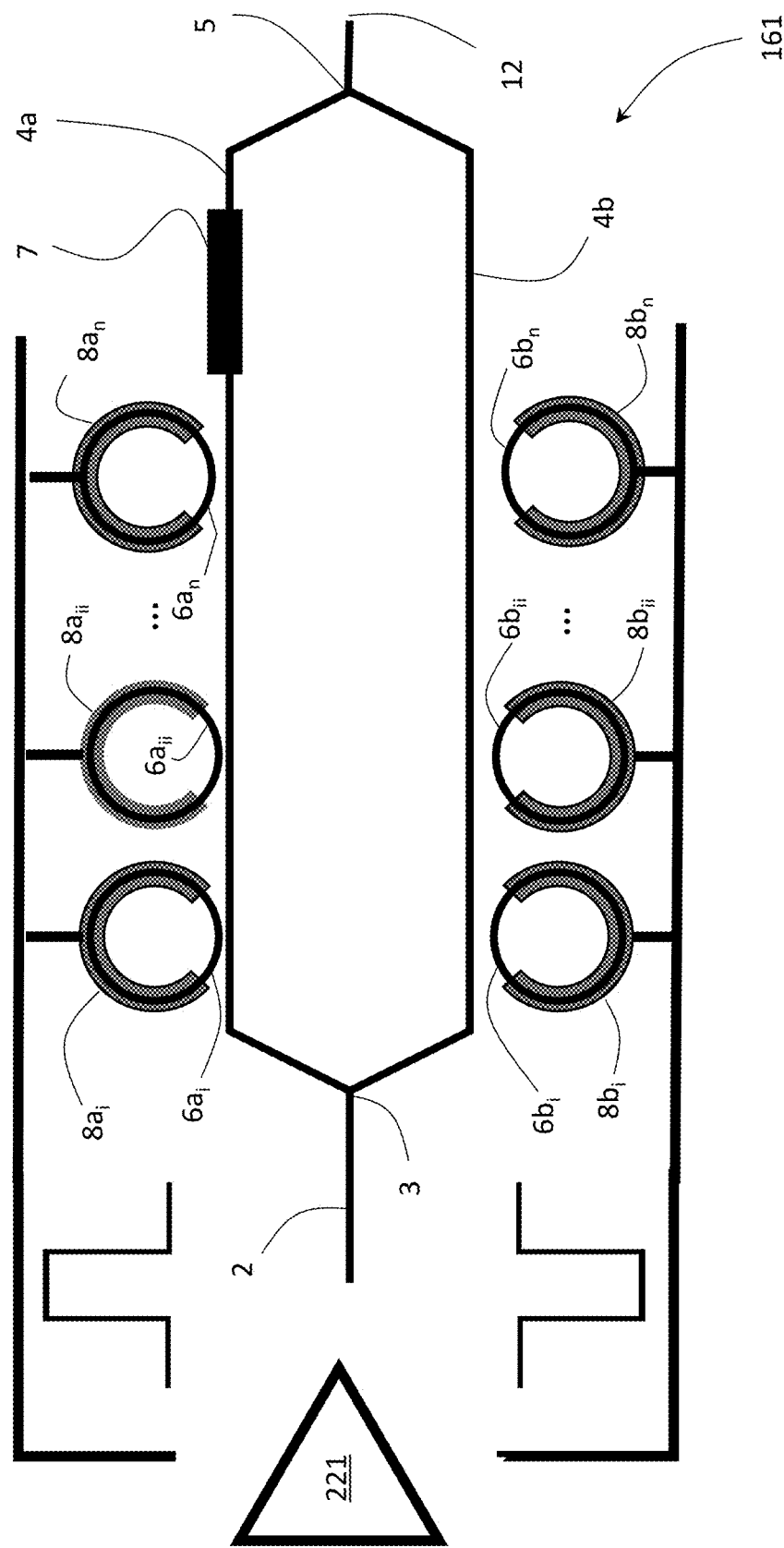
FIG. 21 is a schematic diagram of an alternative embodiment of an MZIRRM with a travelling wave MZM driver.
Figure 22:
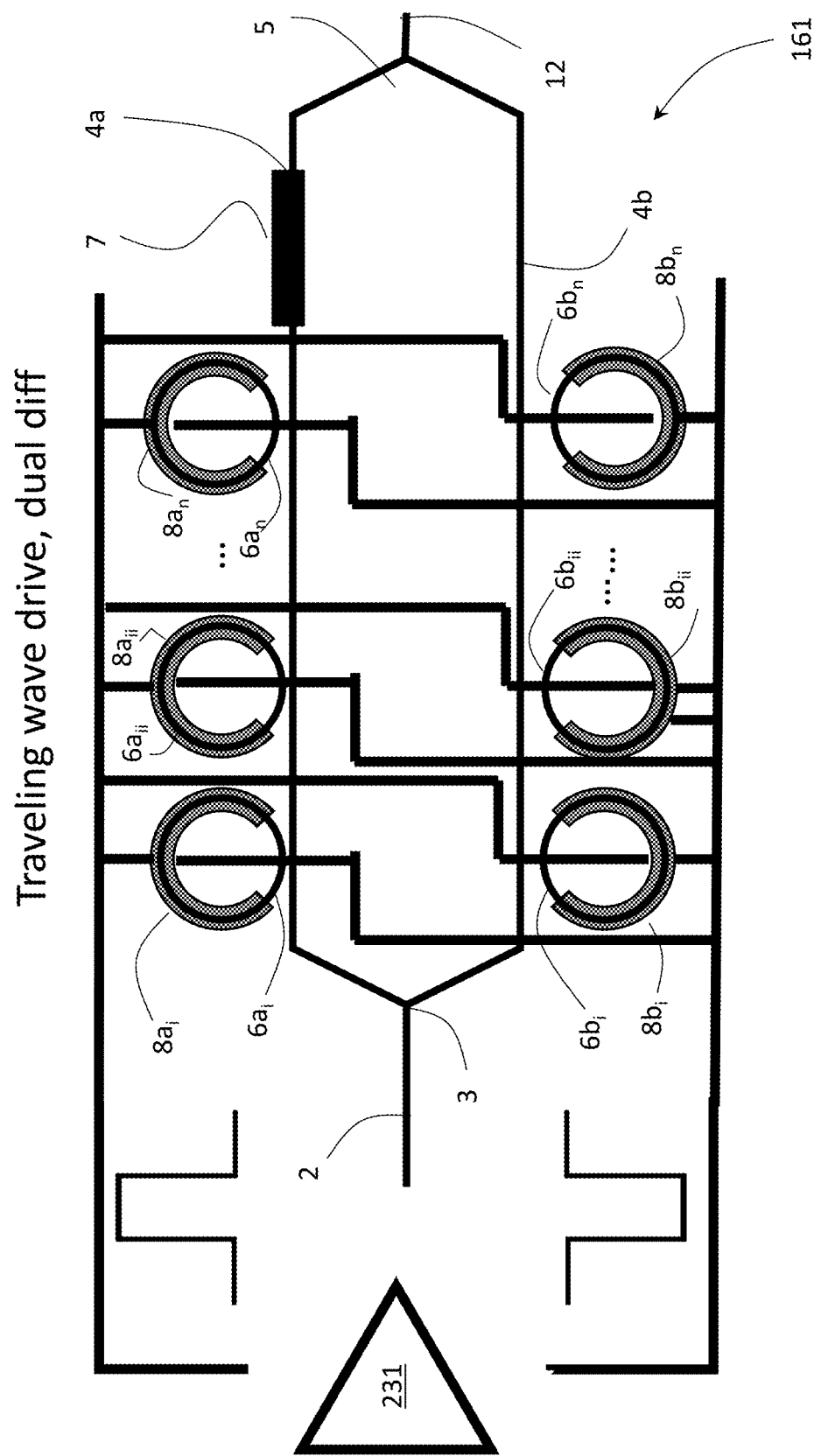
FIG. 22 is a schematic diagram of an alternative embodiment of an MZIRRM with a dual differential travelling wave MZM driver.

With reference to FIGS. 20 to 23, the driver 11 may comprise a single driver, a differential driver, as illustrated in FIG. 1 or a dual differential driver 211, as illustrated in FIG. 20. The dual differential driver 211 may comprise the driver disclosed in U.S. patent application Ser. No. 15/602,657, entitled Optical Waveguide Modulator, filed May 23, 2017 in the name of Christopher Williams et al, and Ser. No. 15/961,254, entitled Optical Waveguide Modulator, filed Apr. 24, 2018 in the name of Villarroel et al, which are incorporated herein by reference.

Figure 23:
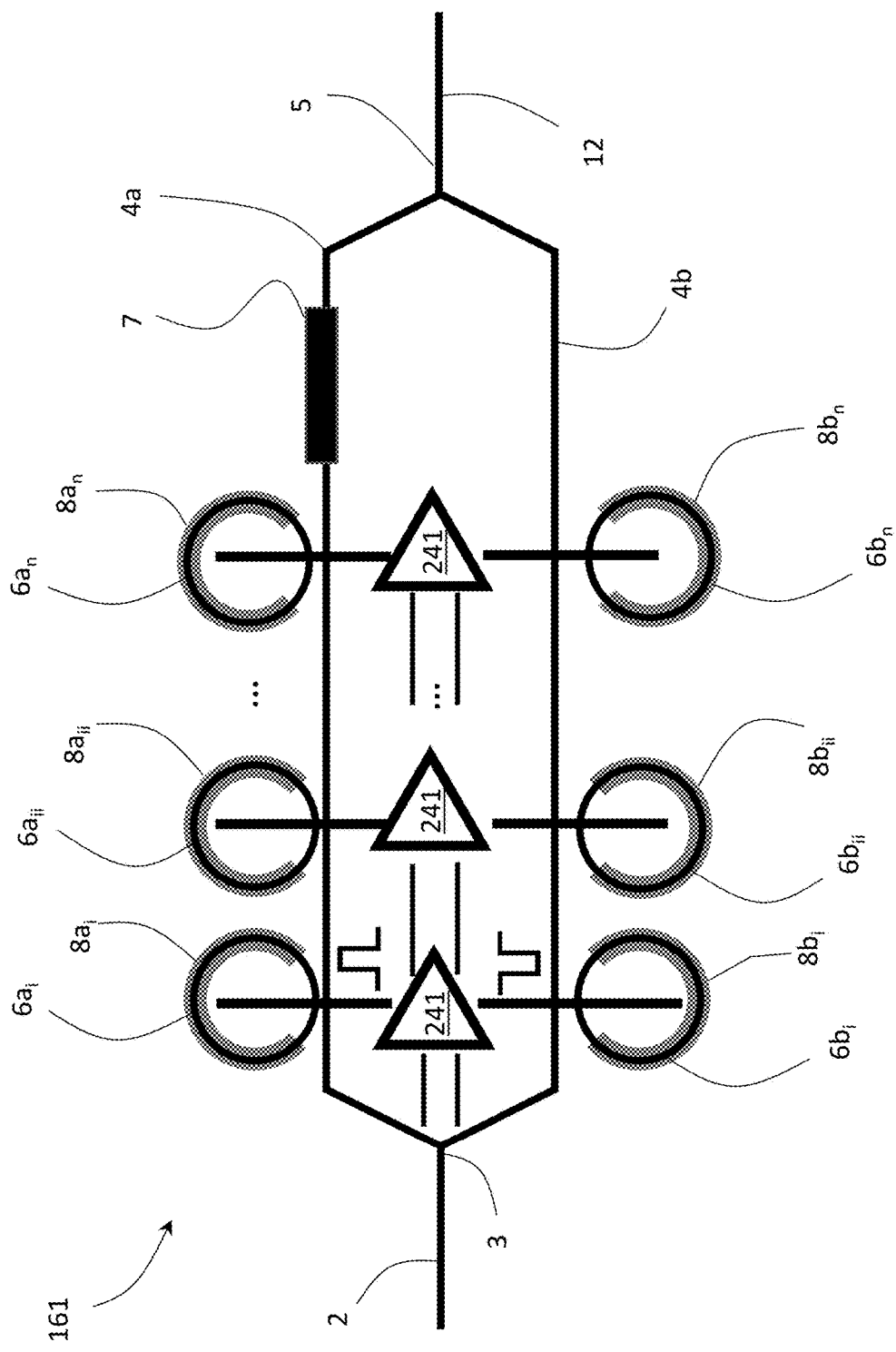
FIG. 23 is a schematic diagram of an alternative embodiment of an MZIRRM with a distributed differential travelling wave MZM driver.

For cascaded parallel RRM's, as in the MZIRRM 161 in FIG. 16, the driver 11 may also comprise a travelling wave MZM driver 221 (FIG. 21), a dual differential travelling wave MZM driver 231 (FIG. 22) or a distributed differential travelling wave MZM driver 241 (FIG. 23). Travelling wave MZM drivers are disclosed in U.S. Pat. No. 9,559,779 issued Jan. 31, 2017 and U.S. Pat. No. 9,853,738 issued Dec. 26, 2017, which are incorporated herein by reference.

Figure 24:
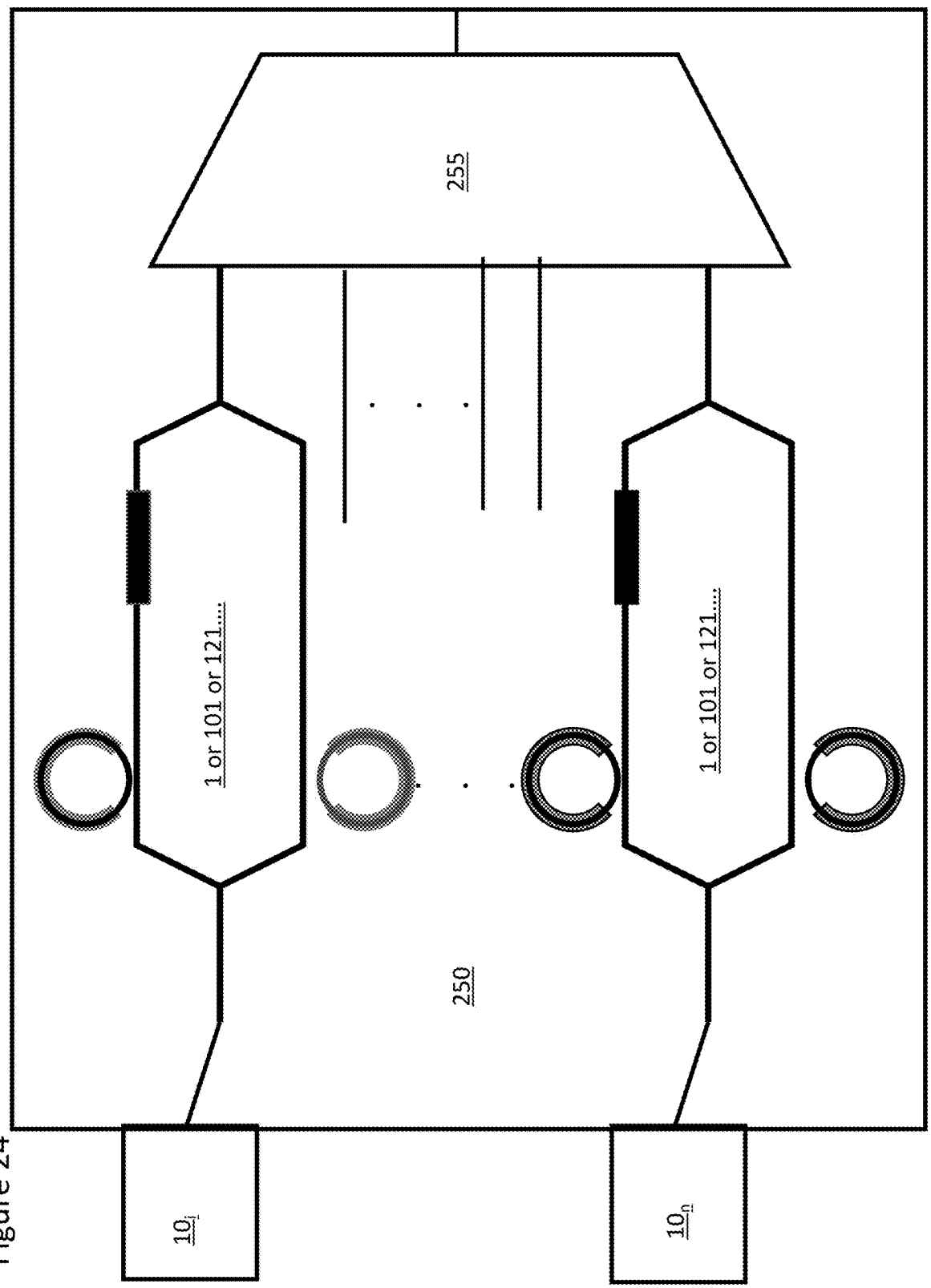
FIG. 24 is a schematic diagram of a plurality of MZIRRM mounted on a same chip.
Figure 25:
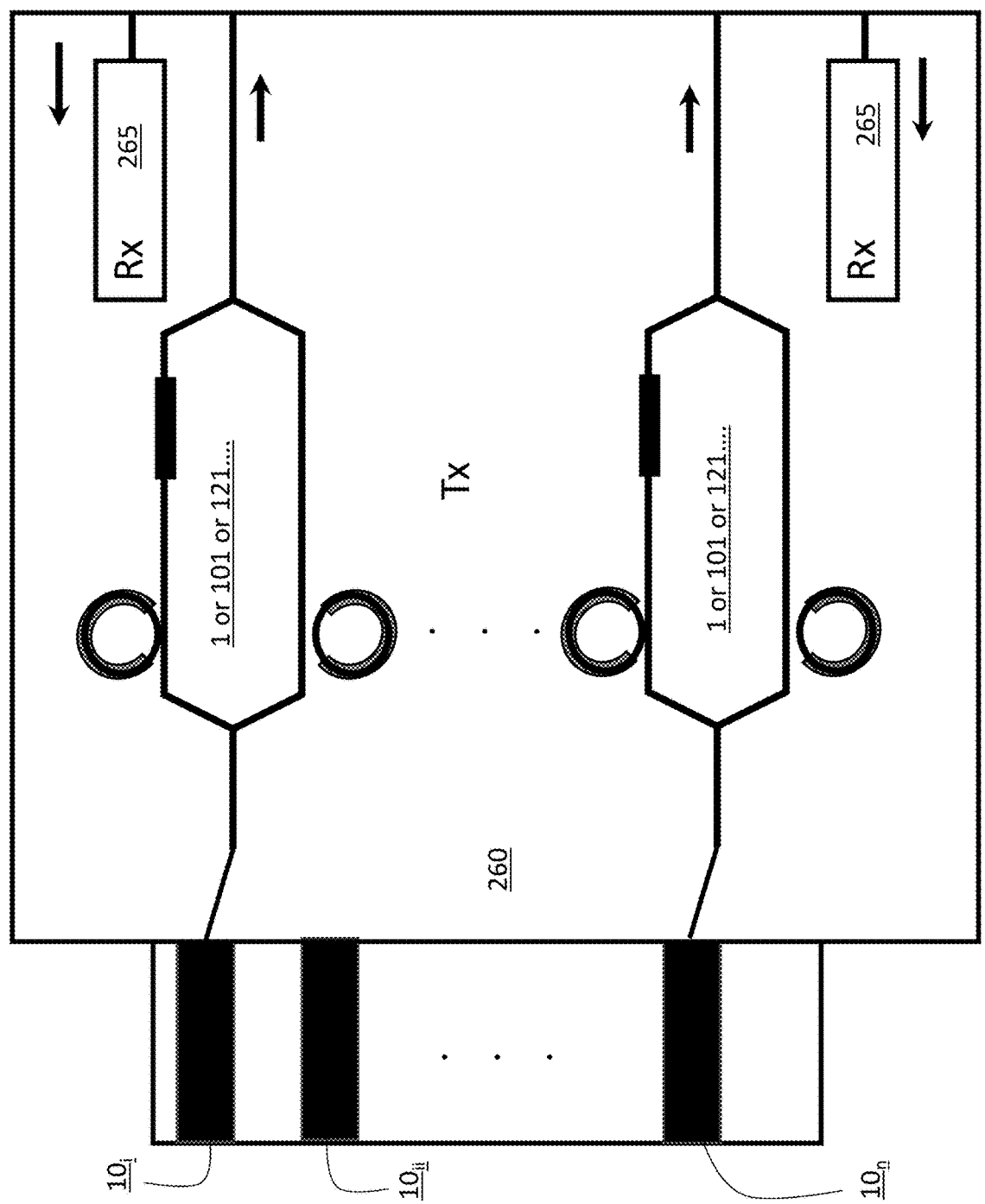
FIG. 25 is a schematic diagram of a plurality of MZIRRM mounted on a same chip.

With reference to FIG. 24, a plurality of MZIRRM 1, 101, 121 etc, may be fabricated in parallel on a same semiconductor, e.g. silicon, photonics integrated chip (PIC) 250. Each light source, e.g. gain medium, $10_i$ to $10_n$ may be coupled to an edge of the PIC 250 or mounted in a cavity formed in the PIC 250. Each light source 10; to 10 may be an independent light sources on separate gain medium chips (FIG. 24) or provided on a single laser bar 261 (FIG. 25). Each light source $10_i$ to $10_n$ may generate the same wavelength or each light source $10_i$ to $10_n$ may generate a different wavelength. A wavelength multiplexer 255 may be provided on the PIC 250 or a separate PIC for multiplexing all of the different modulated signals from each of the light sources $10_i$ to $10_n$.

With reference to FIG. 25, a plurality of MZIRRM 1, 101, 121 etc, may be fabricated in parallel on a same semiconductor, e.g. silicon, photonics integrated chip (PIC) 260. Each light source, e.g. gain medium, $10_i$ to $10_n$ may be coupled to an edge of the PIC 260 or mounted in a cavity formed in the PIC 260. Each light source $10_i$ to $10_n$ may be an independent light sources on separate gain medium chips (FIG. 24) or provided on a single laser bar 261 (FIG. 25). Each light source $10_i$ to $10_n$ may generate the same wavelength or each light source $10_i$ to $10_n$ may generate a different wavelength. A receiver 265 may be provided on the PIC 260 for receiving incoming optical signals and converting them to electrical signals. The optical signals are received either on the same optical waveguide, e.g. fiber, as the outgoing optical signal or a separate waveguide.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A modulator comprising:
   an input port for receiving an input optical signal at a source wavelength;
   a splitter for splitting the input optical signal into first and second sub-beams;
   first and second waveguide arms extending from the splitter configured for supporting the first and second sub-beams, respectively;
   a first ring resonator structure coupled to the first waveguide arm configured for providing a first round trip phase delay ($\theta_{ring1}$) to the first sub-beam;
   a first phase tuner structure configured for adjusting the first round trip phase delay ($\theta_{ring1}$);
   a first phase modulator configured for biasing the first ring resonator structure for generating a first RF phase delay ($\phi_{RF1}$) to the first sub-beam;
   a second ring resonator structure coupled to the second waveguide arm configured for providing a second round trip phase delay ($\theta_{ring2}$) to the second sub-beam;
   a second phase tuner structure configured for adjusting the second round trip phase delay ($\theta_{ring2}$);
   a second phase modulator configured for biasing the second ring resonator structure for generating a second RF phase delay ($\phi_{RF2}$) on the second sub-beam of equal magnitude and opposite sign to the first RF phase delay ($\phi_{RF1}$);
   a static phase difference ($\phi_{static}$) in one of the first and second arms configured for creating a phase difference between the first and second sub-beams travelling in the first and second waveguide arms, respectively;
   an output combiner for combining the first and second sub-beams into an output modulated signal;
   a controller for controlling the first and second phase tuner structures, whereby the first and second phase tuner structures are configured to adjust the first and second ring resonator structures to resonate at the source wavelength; and
   an output port for outputting the output modulated signal.

2. The modulator according to claim 1, wherein the first and second ring resonators comprise substantially the same length.

3. The modulator according to claim 1, further comprising a driver for generating voltage signals for driving the first and second phase modulators ($\phi_{mod1}$ and $\phi_{mod2}$).

4. The modulator according to claim 3, wherein the driver comprises a dual differential driver.

5. The modulator according to claim 1, wherein the first ring resonator structure comprises a plurality of ring resonators coupled along the first arm; wherein the first phase tuner structure comprises a plurality of respective phase tuners.

6. The modulator according to claim 5, further comprising a driver for generating voltage signals for driving; wherein the driver comprises a travelling wave MZM driver.

7. The modulator according to claim 5, further comprising a driver for generating voltage signals for driving the first and second phase modulators; wherein the driver comprises a dual differential travelling wave MZM driver.

8. The modulator according to claim 5, further comprising a driver for generating voltage signals for driving the first and second phase modulators; wherein the driver comprises distributed differential travelling wave MZM driver.

9. The modulator according to claim 1, wherein the first phase tuner structure comprises a thermal phase tuner.

10. The modulator according to claim 9, further comprising an undercut section comprising an opening in cladding under the thermal phase tuner and around the first ring resonator filled with filling material to improve thermal phase tuning efficiency.

11. The modulator according to claim 1, wherein the first phase tuner comprises a doped resistive phase tuner covering a coupling region between the first waveguide arm and the first ring resonator.

12. The modulator according to claim 1, wherein the first phase tuner comprises a doped resistive phase tuner covering a non-coupling region of the first ring resonator.

13. A method of operating a modulator, which comprises:
an input port for receiving an input optical signal at a source wavelength;
a splitter for splitting the input optical signal into first and second sub-beams;
first and second arms extending from the splitter capable of supporting the first and second sub-beams, respectively, the first and second arms including a static phase difference ($\phi_{static}$) in one of the first and second arms capable of creating a phase difference between the first and second sub-beams travelling in the first and second arms, respectively;
first and second ring resonator structures coupled to the first and second arms, respectively, capable of providing first and second round trip phase delays ($\theta_{ring1}$ and $\theta_{ring2}$) to the first and second sub-beams, respectively;
first and second phase tuner structures capable of adjusting the first and second round trip phase delays ($\theta_{ring1}$ and $\theta_{ring2}$), respectively;
first and second phase modulators capable of biasing the first and second ring resonator structures, respectively, for generating first and second RF phase delays ($\phi_{RF1}$ and $\phi_{RF2}$) to the first and second sub-beams, respectively; and
an output combiner for combining the first and second sub-beams into an output modulated signal;
the method comprising setting the first and second ring resonator structures to resonate at the laser wavelength; and
applying the first RF phase delay $\phi_{RF1}$ to the first ring resonator structure, and applying the second RF phase delay $\phi_{RF2}$ to the second ring resonator structure of equal magnitude and opposite sign to the first RF phase delay $\phi_{RF1}$.

14. The method according to claim 13, wherein the method comprises setting the first and second phase tuners to adjust the first and second round trip phase delay, respectively, whereby the first and second ring resonators resonate at the laser wavelength making the first and second round trip phase delays equal to substantially zero.

15. The method according to claim 13, wherein the first and second ring resonators comprise substantially the same length.

16. The method according to claim 13, wherein the first ring resonator structure comprises a plurality of ring resonators coupled along the first arm; wherein the first phase tuner structure comprises a plurality of respective phase tuners.

* * * * *